(12) United States Patent
Takeda

(10) Patent No.: US 11,796,816 B2
(45) Date of Patent: Oct. 24, 2023

(54) VIRTUAL IMAGE DISPLAY APPARATUS

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 79 days.

(21) Appl. No.: 17/536,983

(22) Filed: Nov. 29, 2021

(65) Prior Publication Data

US 2022/0171195 A1 Jun. 2, 2022

(30) Foreign Application Priority Data

Nov. 30, 2020 (JP) ................................ 2020-198142

(51) Int. Cl.
*G02B 27/00* (2006.01)
*G02B 27/01* (2006.01)
*G09G 3/00* (2006.01)

(52) U.S. Cl.
CPC ......... *G02B 27/0172* (2013.01); *G09G 3/002* (2013.01); *G02B 2027/014* (2013.01); *G02B 2027/0132* (2013.01); *G02B 2027/0178* (2013.01); *G09G 2340/0464* (2013.01); *G09G 2340/12* (2013.01)

(58) Field of Classification Search
CPC ........ G02B 27/0172; G02B 2027/0132; G02B 2027/014; G02B 2027/0178; G09G 3/002; G09G 2340/0464; G09G 2340/12
See application file for complete search history.

(56) References Cited

U.S. PATENT DOCUMENTS

| 8,873,148 B1 * | 10/2014 | Gupta | ...................... G02B 3/08 359/624 |
| 9,766,462 B1 * | 9/2017 | Worley | .............. G02B 27/0172 |
| 10,345,590 B2 * | 7/2019 | Samec | ................... A61B 8/461 |
| 2011/0261174 A1 * | 10/2011 | Silverstein | ........... H04N 9/3164 348/58 |

(Continued)

FOREIGN PATENT DOCUMENTS

| JP | 2018-054976 A | 4/2018 | |
| JP | 2018054976 A * | 4/2018 | ........... G02B 27/017 |

(Continued)

OTHER PUBLICATIONS

Lane, B. (Aug. 1982). Stereoscopic displays. In Proc. SPIE (vol. 367, pp. 20-32).*

*Primary Examiner* — Sarah Lhymn
(74) *Attorney, Agent, or Firm* — Oliff PLC

(57) ABSTRACT

A virtual image display apparatus includes a first display device for a right eye, a second display device for a left eye, and an adjustment device configured to adjust display positions, and the first display device and the second display device are configured to guide imaging light in a second direction intersecting a first direction in which the first display device and the second display device are aligned, and display the first image and the second image and the adjustment device makes an adjustment to provide an overlapping area in which the first image and the second image are visually recognized in the overlapping area and an independent area in which the first image and the second image are visually recognized independently.

14 Claims, 18 Drawing Sheets

(56) References Cited

U.S. PATENT DOCUMENTS

| | | | | |
|---|---|---|---|---|
| 2012/0038892 | A1* | 2/2012 | Kurtz | H04N 9/3105 |
| | | | | 353/121 |
| 2016/0055822 | A1* | 2/2016 | Bell | G02B 27/017 |
| | | | | 345/207 |
| 2017/0257620 | A1 | 9/2017 | Takeda et al. | |
| 2019/0004325 | A1* | 1/2019 | Connor | G02B 27/0172 |
| 2019/0287495 | A1* | 9/2019 | Mathur | G06T 5/002 |
| 2019/0324273 | A1* | 10/2019 | Perdices-Gonzalez | |
| | | | | G02B 27/0172 |
| 2020/0051320 | A1* | 2/2020 | Laffont | G02B 27/0172 |
| 2020/0209625 | A1 | 7/2020 | Takeda et al. | |
| 2020/0213580 | A1 | 7/2020 | Takeda et al. | |
| 2020/0225486 | A1* | 7/2020 | Jones | G06F 1/163 |

FOREIGN PATENT DOCUMENTS

| | | |
|---|---|---|
| JP | 2019-179083 A | 10/2019 |
| JP | 2019-179084 A | 10/2019 |
| JP | 2020-106635 A | 7/2020 |
| JP | 2020-106636 A | 7/2020 |
| WO | 2020/100484 A1 | 5/2020 |

\* cited by examiner ically recognize or observe an external world image in a see-through manner. The virtual image display apparatus 100 includes a first display device 100A, a second display device 100B, and a frame FR as a support member (including a bridge portion) that supports the first display device 100A and the second display device 100B while coupling the first display device 100A and the second display device 100B at the center. In
VIRTUAL IMAGE DISPLAY APPARATUS The present application is based on, and claims priority from JP Application Serial Number 2020-198142, filed Nov. 30, 2020, the disclosure of which is hereby incorporated by reference herein in its entirety.

BACKGROUND

1. Technical Field

The present disclosure relates to a virtual image display apparatus such as a head-mounted display that enables the formation and observation of a virtual image.

2. Related Art

A binocular virtual image display apparatus (virtual image display apparatus) such as a head-mounted display enables the formation and observation of a virtual image. A known virtual image display apparatus guides imaging light (image light) from the ear side to the nose side of an observer, and is capable of changing the display positions of a first image and a second image visually recognized by the right and left eyes, and making the display contents of the first image and the second image differ from each other (see JP-A-2020-106636).

However, in a case of the virtual image display apparatus that guides imaging light (image light) from the ear side to the nose side of the observer (wearer) as exemplified in JP-A-2020-106636, a light-guiding device for guiding the imaging light extends along the right-left direction from the ear to the nose. Therefore, when, for example, the light-guiding device is moved to the right and left in order to change the display positions of the first image and the second image, there is a possibility that the entire apparatus may become large, or a problem may occur in the design when the virtual image display apparatus is a head-mounted type.

SUMMARY

A virtual image display apparatus according to an aspect of the present disclosure includes a first display device configured to display a first image for a right eye, a second display device configured to display a second image for a left eye, and an adjustment device configured to adjust a display position of the first image and a display position of the second image, and the first display device and the second display device are configured to guide imaging light in a second direction intersecting a first direction in which the first display device and the second display device are aligned, and display the first image and the second image and the adjustment device makes an adjustment to provide an overlapping area in which the first image and the second image are visually recognized in the overlapping area and an independent area in which the first image and the second image are visually recognized independently.

DESCRIPTION OF EXEMPLARY EMBODIMENTS

First Exemplary Embodiment

A virtual image display apparatus according to a first exemplary embodiment of the present disclosure will be described below in detail with reference to FIG. 1 and the like.

Figure 1:
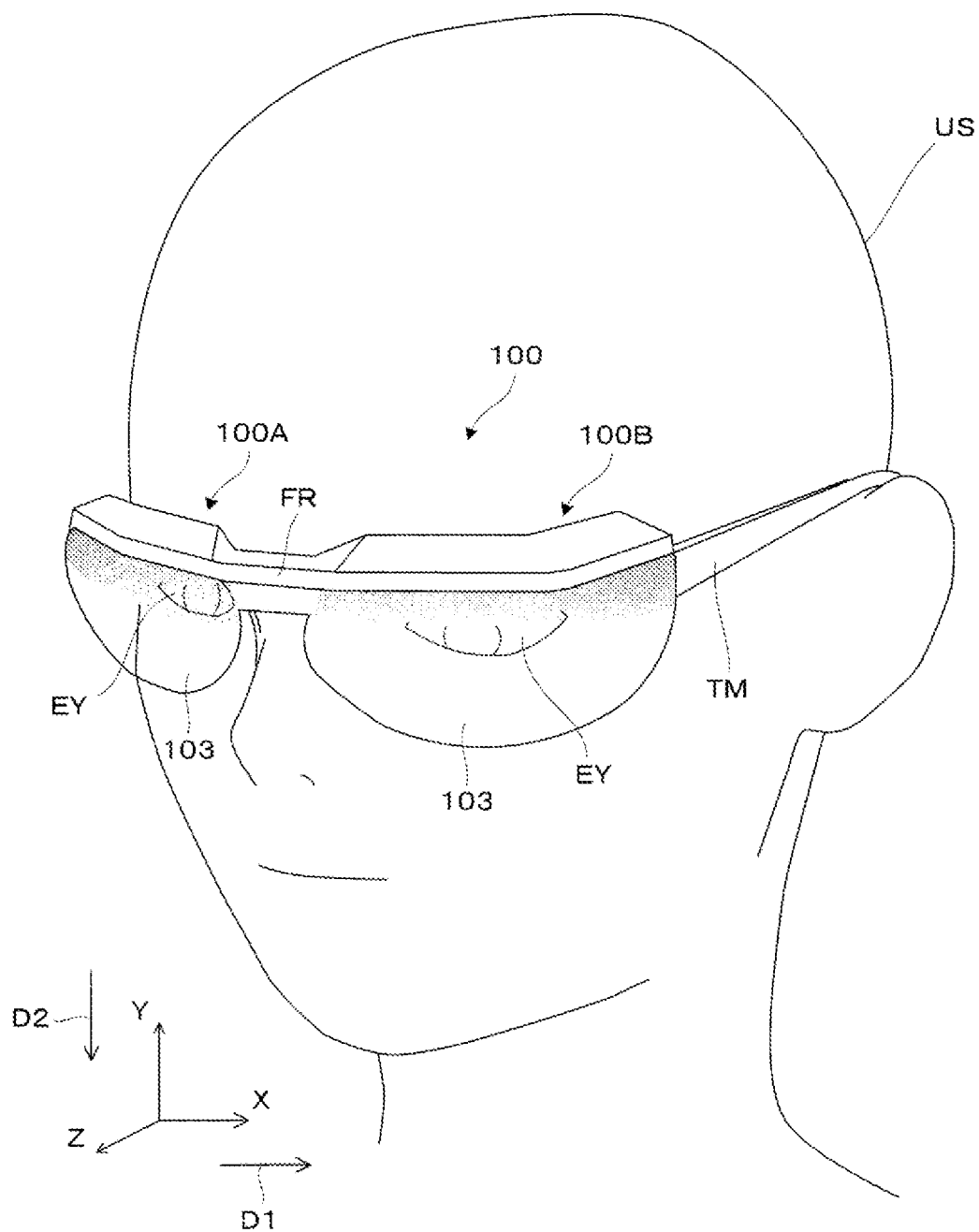
FIG. 1 is a conceptual perspective view illustrating a virtual image display apparatus according to a first exemplary embodiment.
Figure 2:
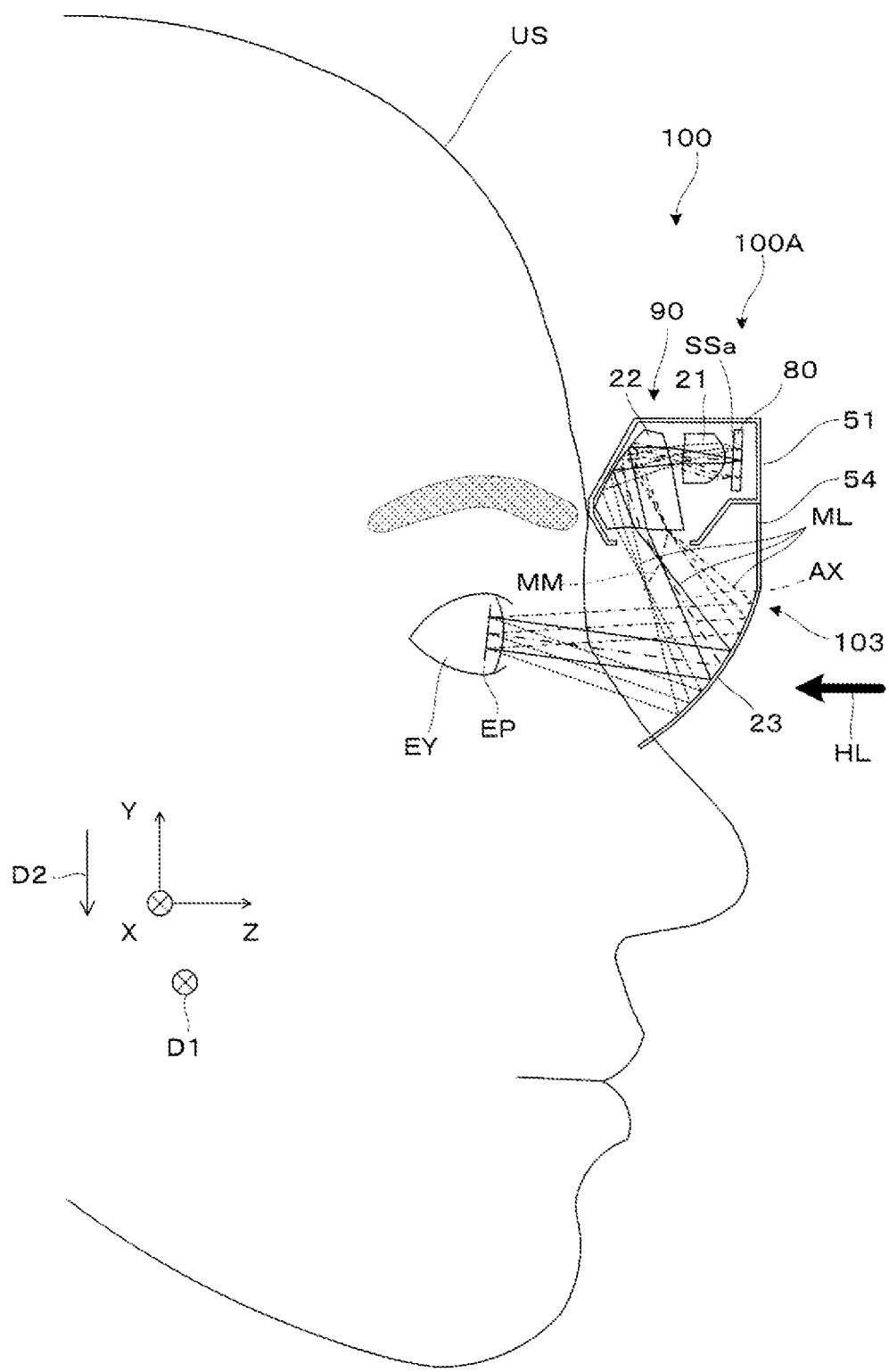
FIG. 2 is a side cross-sectional view illustrating an example of an internal structure of the virtual image display apparatus.

For example, as illustrated in FIGS. 1, 2, and the like, a virtual image display apparatus 100 of this embodiment is a head-mounted display (HMD) having an appearance like glasses, that is, a head-mounted display device. By wearing the virtual image display device 100, an observer or a user can visually recognize a virtual image by the imaging light (image light), and the observer can visually recognize or observe an external world image in a see-through manner. The virtual image display apparatus 100 includes a first display device 100A, a second display device 100B, and a frame FR as a support member (including a bridge portion) that supports the first display device 100A and the second display device 100B while coupling the first display device 100A and the second display device 100B at the center. In other words, the frame FR functions as a mounting member for mounting an optical system included in the first display device 100A and an optical system included in the second display device 100B. Further, in an example here, the mounting members are configured to change the positions at which the first display device 100A and the second display device 100B are mounted. Therefore, the mounting members function as an adjustment device for adjusting the display positions in the first display device 100A and the second display device 100B. Note that a detailed example of the mounting member and the adjustment device will be described later with reference to FIGS. 5, 6, and the like.

Note that, in FIG. 1 and the like, X, Y, and Z are axes of an orthogonal coordinate system. A +X direction corresponds to a lateral direction in which both eyes EY of an observer or a wearer US wearing the virtual image display apparatus 100 are aligned, a +Y direction corresponds to an upward direction orthogonal to the lateral direction in which both eyes EY of the wearer US are aligned, and a +Z direction corresponds to a forward direction or a front direction of the wearer US. A ±Y direction is parallel to the vertical axis or the vertical direction. For each of the above-described directions, for example, a ±X direction may be considered to be a direction parallel to, for example, the direction from the first display device 100A for the right eye toward the second display device 100B for the left eye. As described above, the ±X direction is a direction (right-left direction) in which the first display device 100A and the second display device 100B are aligned, and hereinafter, this direction is referred to as a first direction D1. Additionally, a direction intersecting the first direction D2 is referred to as a second direction D2, and here, the ±Y direction (up-down direction) perpendicular to the ±X direction is referred to as the second direction D2. Note that in the figures, the −Y direction is an exemplary example of the second direction D2.

As illustrated in FIGS. 1 and 2, and as described above, the first display device 100A and the second display device 100B are portions that form a virtual image for the right eye and a virtual image for the left eye, respectively. Note that since the first display device 100A and the second display device 100B have the optically equivalent structure, only the first display device 100A is illustrated in FIG. 2, and illustration and description of the second display device 100B will be omitted.

As illustrated in FIG. 2, in the virtual image display apparatus 100 according to this embodiment, the first display device 100A for the right eye includes a display element 80 and a light guide system 90 as optical elements. The light guide system 90 guides imaging light ML from the display element 80 to a formation position of an exit pupil EP. In other words, the first display device 100A guides the imaging light ML in the second direction D2 that intersects the first direction D1. Note that, as illustrated, the first display device 100A guides the imaging light ML in various directions by having a reflecting surface and bending the optical path of the imaging light ML. However, it can be said that the imaging light ML is guided in the second direction D2, that is, in the longitudinal direction as a whole from the display element 80 to the exit pupil EP. Here, as described above, as long as the first display device 100A guides the imaging light ML in the second direction D2 that intersects the first direction D1 as a whole while guiding components of the imaging light ML in various directions, it is assumed that the first display device 100A guides the imaging light ML in the second direction D2.

The display element 80 is a panel type image element (imaging light generator). The display element 80 is a light emitting display device such as an organic electro-luminescence (organic EL), and forms a color still image or a moving image on a two-dimensional display surface SSa. In addition, the display element 80 is driven by a display control circuit (not illustrated) to perform the display operation. Further, the display element 80 is not limited to the organic EL, and can be replaced with an inorganic EL, an LED array, an organic LED, a laser array, a quantum dot light emitting element, or the like. The display element 80 is not limited to the light emitting display device, but may be constituted of an LCD or other light modulation element, and may form an image by illuminating the light modulation element with a light source such as a backlight. As the display element 80, a liquid crystal on silicon (LCOS, LCoS is a registered trademark), a digital micromirror device, or the like may be used instead of the LCD.

The light guide system 90 includes a projection optical system 21, a prism 22, and a see-through mirror 23. The projection optical system 21 converges the imaging light ML emitted from the display element 80 to a state close to a parallel pencil of rays. The projection optical system 21 is a single lens in the illustrated example, and has an incident surface and an emission surface. The prism 22 has an incident surface, an internal reflecting surface, and an emission surface. In the prism 22, the imaging light ML emitted from the projection optical system 21 is incident on the incident surface while being refracted, is totally reflected by the internal reflecting surface, and is emitted from the emission surface while being refracted. The see-through mirror 23 reflects the imaging light ML emitted from the prism 22 toward the exit pupil EP. The exit pupil EP is placed at a position where the components of the imaging light from the points on the display surface SSa are incident so as to overlap each other in a predetermined diverging state or in a parallel state from angle directions corresponding to the positions of the points on the display surface SSa.

The projection optical system 21 and the prism 22 are housed in a case 51 together with the display element 80. The case 51 is formed of a light shielding material, and embeds a driving circuit (not illustrated) that operates the display element 80. An opening of the case 51 has a size such that the opening of the case 51 does not interfere with the imaging light ML from the prism 22 toward the see-through mirror 23. The opening of the case 51 may not be merely an opening, but may be an opening covered with a protective cover having optical transparency. The see-through mirror 23 is supported by the case 51 via a support plate 54. The case 51 or the support plate 54 is supported by the frame FR (see FIG. 1), and an appearance member 103 is constituted of, for example, the support plate 54 and the see-through mirror 23.

The light guide system 90 is an off-axis optical system. In other words, the projection optical system 21, the prism 22, and the see-through mirror 23 constituting the light guide system 90 are arranged so as to form the off-axis optical system. Note that when the light guide system 90 is the off-axis optical system, in the optical elements 21, 22, and 23 constituting the light guide system 90, the optical path as a whole is bent at least on one reflecting surface or after the light beams are incident on one refracting surface. Further, an optical axis AX of the light guide system 90, which is the off-axis optical system as described above, is arranged in a Z shape when viewed in a cross section. In other words, in the illustration, an optical path from the projection optical system 21 to the internal reflecting surface, an optical path from the internal reflecting surface to the see-through mirror 23, and an optical path from the see-through mirror 23 to the exit pupil EP are arranged in a Z shape with a two-step bend.

Note that in the illustration, an intermediate image MM is formed between the prism 22 and the see-through mirror 23.

External light HL that has passed through the see-through mirror 23 is also incident on the exit pupil EP. In other words, the wearer US wearing the virtual image display apparatus 100 can observe a virtual image formed by the imaging light ML in a state where the external image is overlapped.

Figure 3:
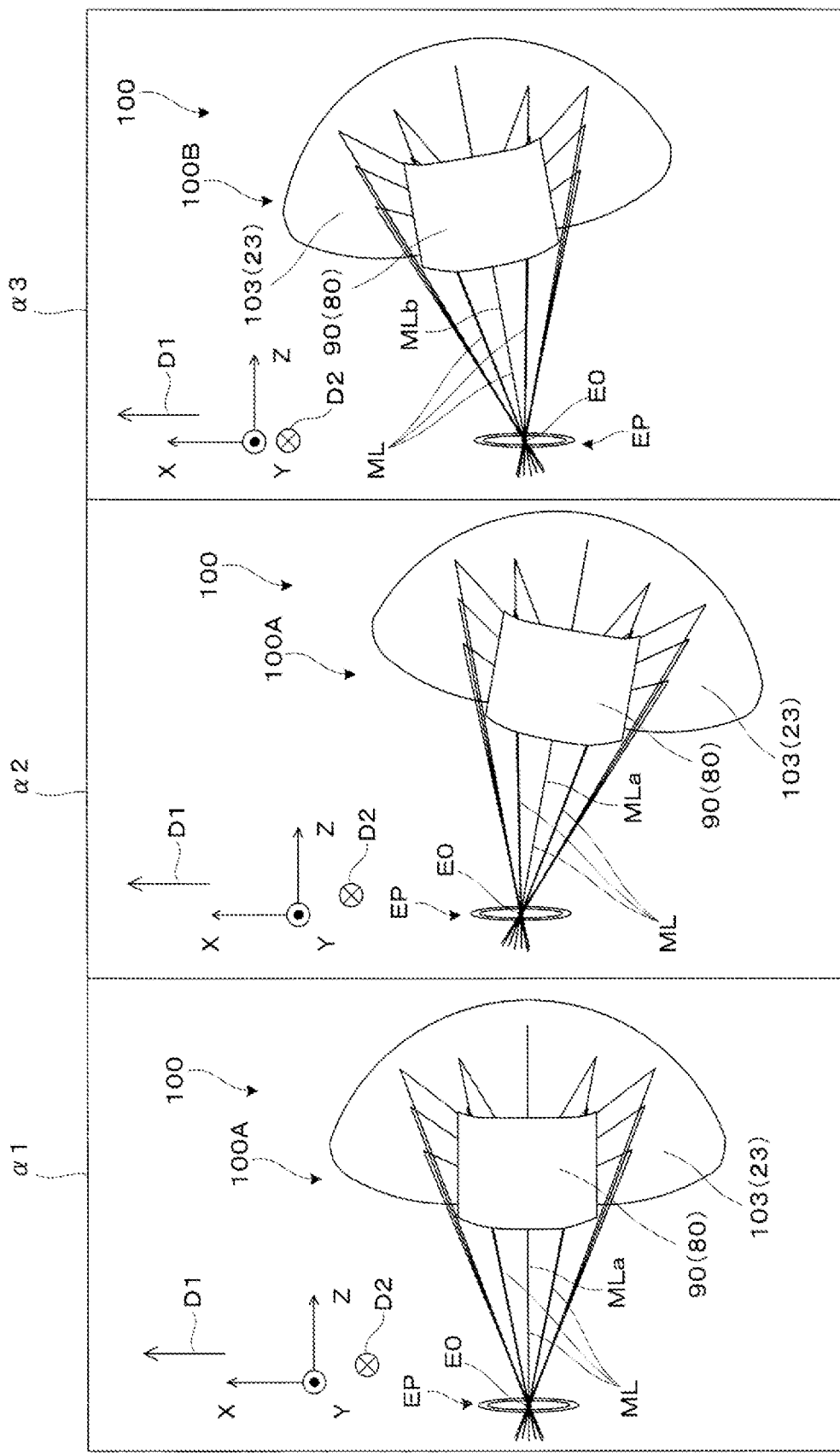
FIG. 3 is a conceptual plan view for describing a rotational operation as a posture adjustment of a first display device.

Here, as can be seen by comparing a state α1 and a state α2 in FIG. 3, the first display device 100A having the configuration described above is rotatable about the perpendicular axis direction, that is, the ±Y direction, which is the second direction D2. In particular, in this embodiment, the entire first display device 100A is rotated about the axis passing through a center position EO of the exit pupil EP as the center of rotation. With this configuration, the virtual image display apparatus 100 is capable of changing the position (angle) of the image (virtual image) displayed by the first display device 100A. Note that, as illustrated as a state α3, similarly, for the second display device 100B, the position (angle) of the image to be displayed is changed by rotating the entire second display device 100B about the axial direction.

The above-described states α1 to α3 will be described more specifically. First, among the states, the state α1 illustrates a state before the rotation of the first display device 100A, and the optical paths of the components of the imaging light ML incident on the center position EO are also illustrated. In the case of the state α1, of the light rays as the imaging light ML emitted from the first display device 100A, a reference component MLa is designed so that the center of the image is in the Z direction, which is the forward direction of the eye EY of the wearer US.

On the other hand, among the states, in the state α2, from the state α1, the entire optical system constituting the first display device 100A is rotated by 10 degrees about the Y axis from the direction X toward the direction Z with the center position EO as the center of rotation. In this case, the image (virtual image) seen in the front (direction of the angle of view of 0 degrees) in the state α1, that is, the image by the reference component MLa, is visually recognized as having moved to a position off the center (direction of the angle of view of 10 degrees) in the state α2. Note that more details about the appearance of the virtual image will be described later with reference to FIG. 8 and the like.

In addition, the axial rotation similar to that of the first display device 100A described above is also performed in the second display device 100B as illustrated in the state α3 among the illustrated states. However, in the second display device 100B, the rotation direction is opposite to that of the first display device 100A, and the entire optical system constituting the second display device 100B is rotated by 10 degrees about the Y axis from the direction Z toward the direction X with the center position EO as the center of rotation. In this case, the image by a reference component MLb of the imaging light ML is visually recognized as having moved to a position off the center (direction of the angle of view of 10 degrees).

As described above, by rotating the first display device 100A and the second display device 100B about the axis, the virtual image display apparatus 100 can adjust the FOV, particularly widen the FOV, by controlling the degree of overlap of the right and left images.

Figure 4:
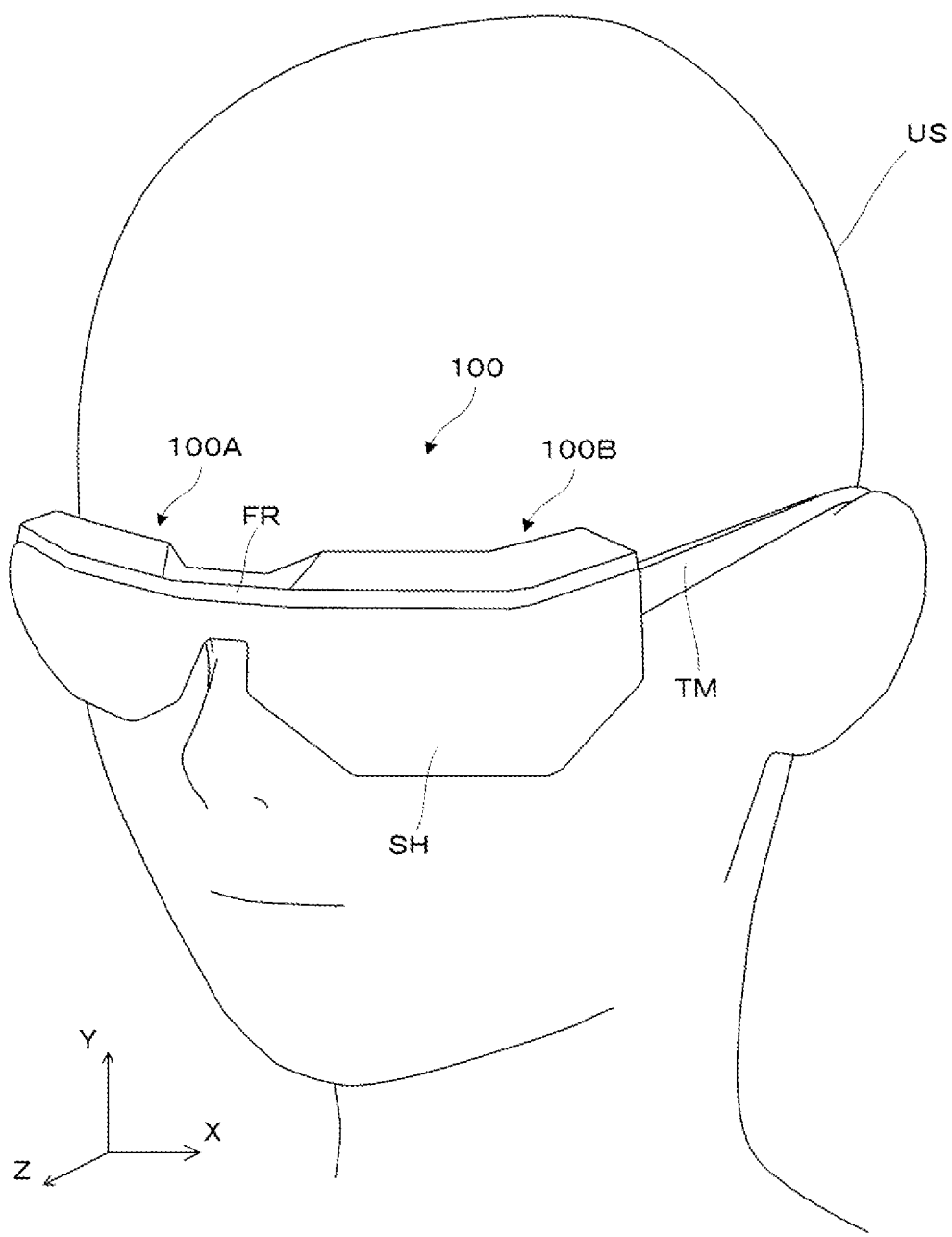
FIG. 4 is a conceptual perspective view illustrating a virtual image display apparatus equipped with a dimming member.
Figure 5:
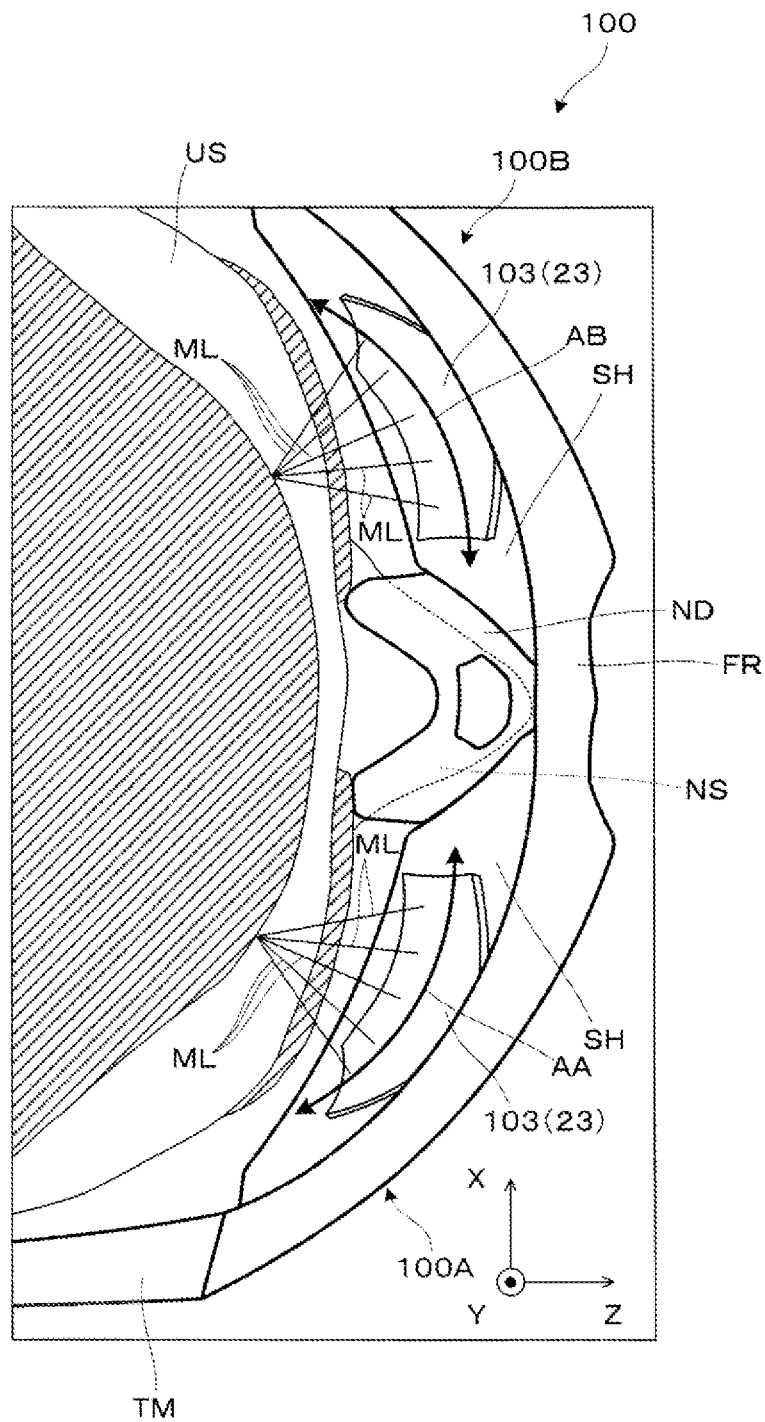
FIG. 5 is a conceptual plan view for describing a relationship between the posture adjustment and the equipped dimming member.

Note that, as illustrated in FIGS. 4 and 5, in the virtual image display apparatus 100, it is also possible to cover the entire front side of the eyes with a shade SH as a dimming member. In this case, even when the postures of the first display device 100A and the second display device 100B as described above are adjusted, that is, even when the first display device 100A and the second display device 100B move in the directions indicated by double-headed arrows AA and AB in FIG. 5, the shade SH can make it difficult for anyone other than the wearer US to see such movements of the optical systems. From a different point of view, the shade SH is a member that covers the first display device 100A and second display device 100B that can be moved. Note that the virtual image display apparatus 100 is provided with a nose pad ND that comes into contact with a nose NS of the wearer US. The frame FR and the shade SH are supported and positioned by the wearer US via the nose pad ND and temples TM.

Hereinafter, an example of a structure for enabling the posture adjustment (rotation about axis) of each of the first display device 100A and the second display device 100B will be described with reference to FIG. 6 and the like. Note that, in FIG. 6 and the like, the first display device 100A will be used as a representative for description. Since the structure of the second display device 100B is similar to one of the first display device 100A, illustration and description thereof will be omitted.

Figure 6:
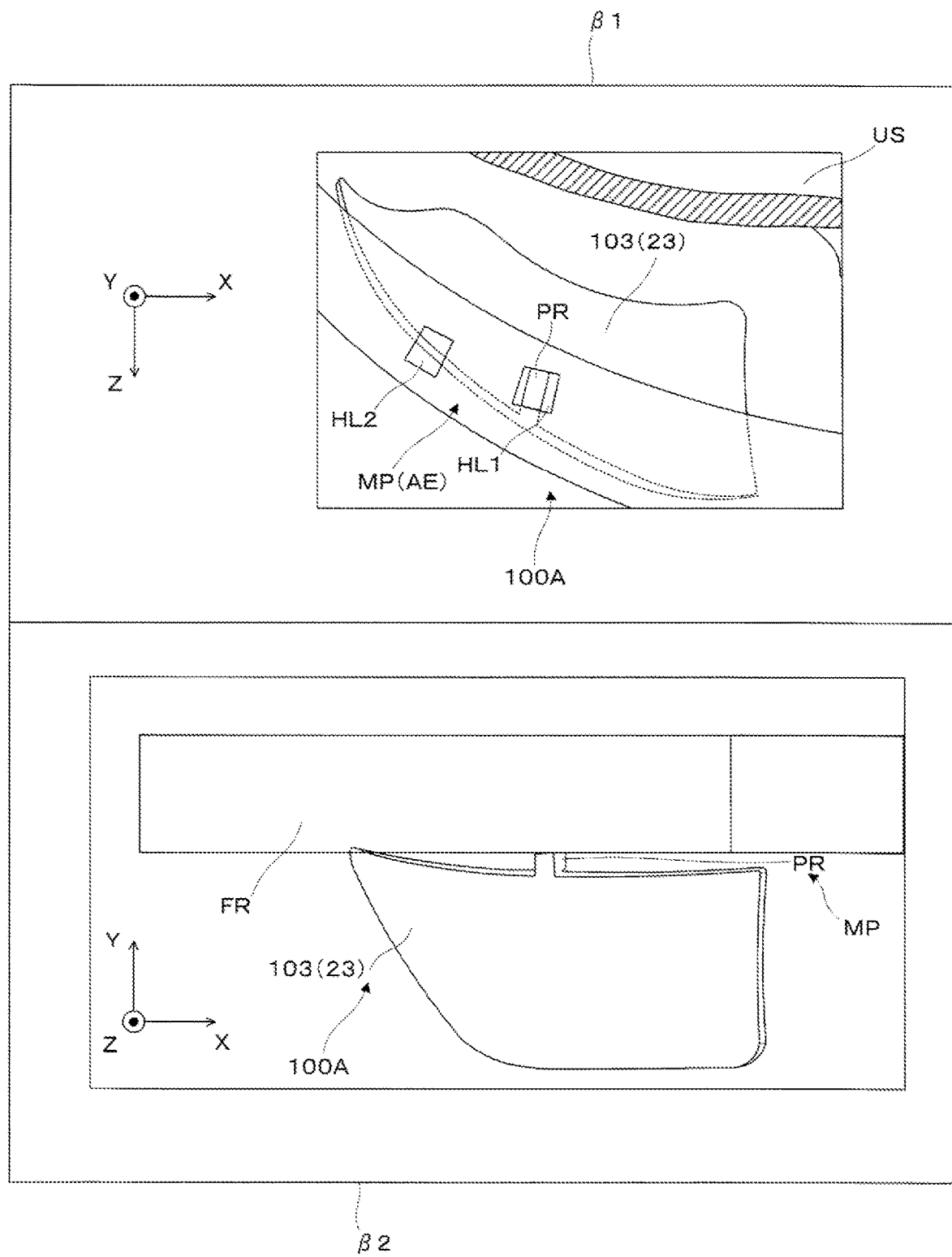
FIG. 6 is a conceptual diagram for describing an example of a structure of a mounting member for the posture adjustment.
Figure 7:
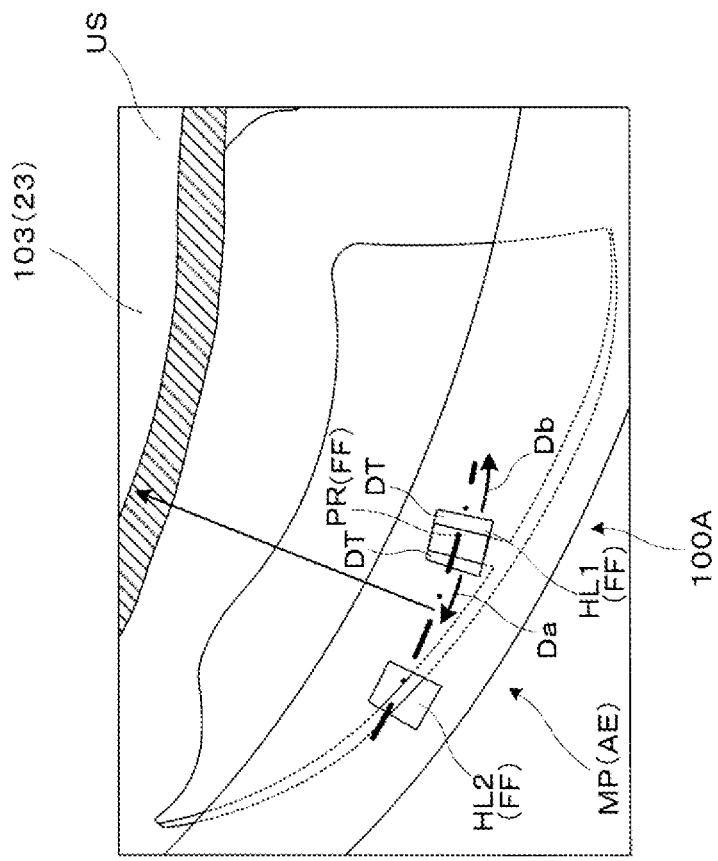
FIG. 7 is a conceptual diagram for describing an operation direction in the posture adjustment.

FIG. 6 is a conceptual diagram for describing an example of a structure of a mounting member MP for the posture adjustment in the first display device 100A, and FIG. 7 is a conceptual diagram for describing an operating direction in the posture adjustment. Note that, in the figure, for the sake of simplicity, the posture adjustment is illustrated by changing the position of the appearance member 103 including the optical system included in the first display device 100A. However, in practice, the position of the entire optical system constituting the first display device 100A including the see-through mirror 23 and the like is changed.

As illustrated in an upper column β1 of FIG. 6, the frame FR is provided with holes (opening portions, or openings) HL1 and HL2 at a plurality of positions (two in the illustrated example). On the other hand, as illustrated in the upper column β1 and a lower column β2, the appearance member 103 is provided with a protrusion portion PR that can be fitted into the holes HL1 and HL2. That is, in the illustrated example, the protrusion portion PR is fitted into the hole HL1, but can also be fitted into the hole HL2. The holes HL1 and HL2 are arranged so as to allow the posture change along the rotational movement around the center position EO of the exit pupil EP, as described with reference to FIG. 3. That is, by changing the fitting position of the protrusion portion PR, it is possible to change to the desired posture. In other words, the holes HL1 and HL2 and the protrusion portion PR function as the mounting member MP that changes the support position of the first display device 100A in the frame FR as the support member, and are fitting members FF provided at a plurality of positions of the frame FR and can be fitted. Further, the mounting member MP is also included in an adjustment device AE that adjusts the display position of the first image by the first display device 100A.

More specifically, as illustrated in FIG. 7, the holes HL1 and HL2 are arranged substantially along the frame FR. Therefore, in the first display device 100A, the posture of the optical system can be changed with the Y direction as the axial direction and the center position EO as the center of rotation, as illustrated in FIG. 3, for example. In other words, by switching between the first state in which the protrusion portion PR is fitted into the hole HL1 (state α1 in FIG. 3) and the second state in which the protrusion portion PR is fitted into the hole HL2 (state α2 in FIG. 3), it is possible to select whether the display position of the first image by the first display device 100A is close to the center (nose side) or the outside (ear side).

Further, as illustrated by arrows Da and Db in FIG. 7, the holes HL1 and HL2 are each provided with adjustment margins (gaps) DT that make the protrusion portion PR movable along a direction corresponding to the rotational direction corresponding to the above-described posture change. This makes it possible to finely adjust the posture of the first display device 100A. Note that various aspects can be considered for the shapes of the holes HL1 and HL2 and the protrusion portion PR that are the fitting members FF. In the illustrated example, the shape of each of the holes HL1 and HL2 is such that no gap is formed in order to suppress the movement of the protrusion portion PR in directions other than the direction corresponding to the rotational direction.

Note that although not illustrated, the second display device 100B is also provided with a protrusion portion that functions as a mounting member, and a plurality of holes corresponding to the protrusion portion are provided in the frame FR. In other words, the mounting members are included in the adjustment device that adjusts the display position of the second image by the second display device 100B. In summary, the mounting members provided on the first display device 100A and the second display device 100B function as the adjustment device.

Figure 8:
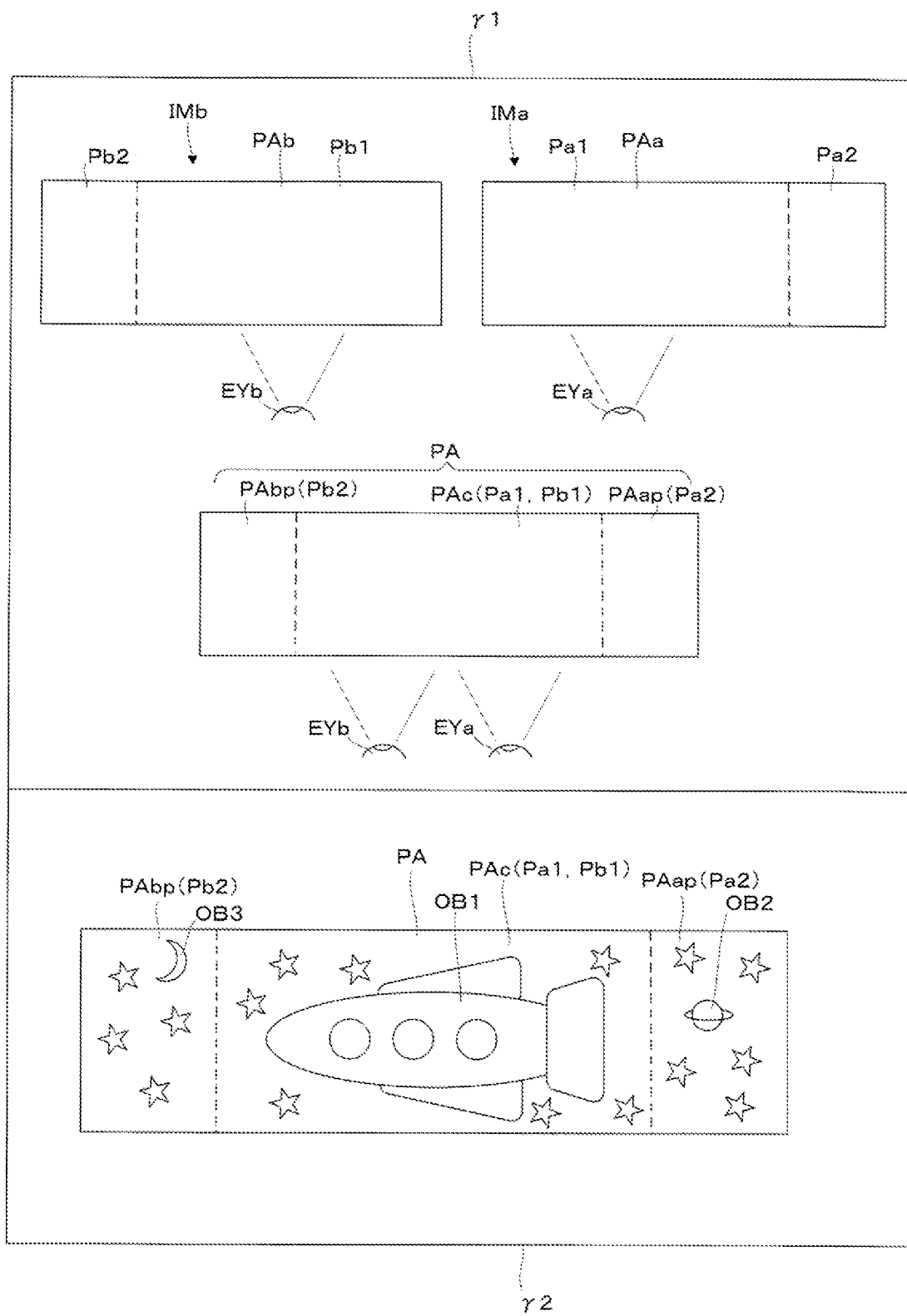
FIG. 8 is a conceptual diagram of the entire image area recognized by binocular vision.
Figure 9:
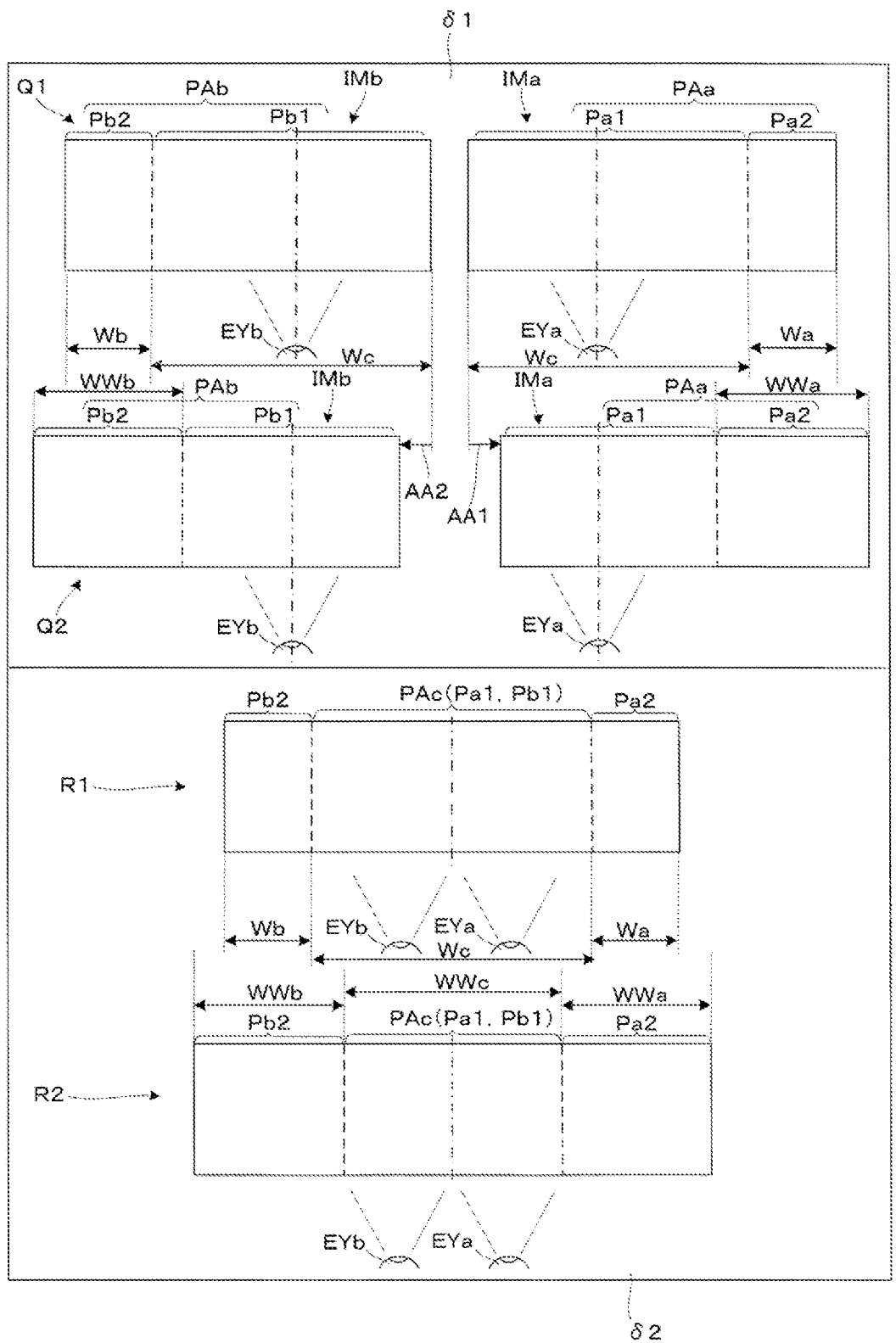
FIG. 9 is a conceptual diagram for describing adjustment of a display range.
Figure 10:
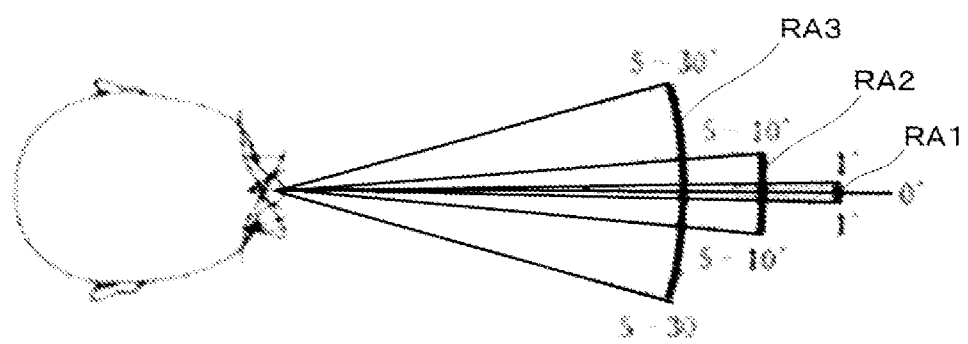
FIG. 10 is a diagram for describing human visual characteristics.

Hereinafter, the visual recognition of the virtual image in the virtual image display apparatus 100 having the above-described configuration will be described in more detail with reference to FIG. 8 and the like. FIG. 8 is a conceptual diagram for describing the entire image area recognized by both eyes of the wearer US. Further, FIG. 9 is a diagram for describing human visual characteristics, and FIG. 10 is a conceptual diagram for describing a visual field of the wearer US.

First, as illustrated in an upper column γ1 of FIG. 8, a virtual area for the virtual image visually recognized by a right eye EYa of the wearer US, that is, an image area visually recognized derived from the imaging light ML from the first display device 100A, which guides the imaging light ML and displays a first image IMa for the right eye is referred to as a first image area PAa. Similarly, a virtual area for the virtual image visually recognized by a left eye EYb, that is, an image area visually recognized derived from the imaging light ML from the second display device 100B, which guides the imaging light ML and displays a second image IMb for the left eye is referred to as a second image area PAb. Further, as a result of visually recognizing the first image IMa and the second image IMb with both eyes EYa and EYb, the virtual entire image area recognized as one image in the brain of the wearer US is referred to as an image area PA.

In this embodiment, as described above, the postures of the first display device 100A and the second display device 100B can be adjusted. In other words, it is possible to adjust the emission angle of the imaging light ML corresponding to each of the display positions in the eyes EYa and EYb. In this case, among the components of the imaging light ML from the first display device 100A and the second display device 100B, the components emitted in the overlapping angle range (angle of view) is recognized as one image common to both eyes EYa and EYb. On the other hand, among the components of the imaging light ML, components other than those described above are visually recognized only on the corresponding side of the eyes EYa or EYb, assuming that the components are emitted only from the first display device 100A or only from the second display device 100B.

Here, as illustrated, on the right eye side, of the first image area PAa, a area that is visually recognized as common to the right and left eyes EYa and EYb, that is, a area in which the angle range in which the imaging light ML is emitted overlaps, is referred to as an overlapping area Pa1, and a area that is visually recognized independently, that is, a area in which an angle range does not overlap is referred to as an independent area Pa2.

Similarly, on the left eye side, of the second image area PAb, a area that is visually recognized as common to the right and left eyes EYa and EYb, that is, a area in which the angle range in which the imaging light ML is emitted overlaps, is referred to as an overlapping area Pb1, and a area that is visually recognized independently, that is, a area in which an angle range does not overlap is referred to as an independent area Pb2.

In this case, for example, by displaying the same image in the overlapping area Pa1 for the right eye and the overlapping area Pb1 for the left eye, the wearer US recognizes this image as one image. On the other hand, the wearer US recognizes the overlapping area Pa1 and the independent area Pa2 adjacent thereto as one combined image. Similarly, the wearer US also recognizes the overlapping area Pb1 and the independent area Pb2 adjacent thereto as one combined image. That is, in the above case, the image area PA, which is a virtual entire image area, is recognized as one large area in which a central area PAc, which corresponds to the overlapping areas Pa1 and Pb1 and is recognized as one image in the central portion by overlapping in the brain, and peripheral areas PAap and PAbp corresponding to the independent areas Pa2 and Pb2 are combined. As a result, as illustrated in a lower column γ2, an image including an image object OB1 (a rocket image object) displayed in the central area PAc (overlapping areas Pa1 and Pb1) and images including image objects OB2 and OB3 (a planetary image object and a moon image object) displayed in the peripheral areas PAap and PAbp (independent areas Pa2 and Pb2) can be visually recognized as one large image as a whole. That is, it can be adjusted to widen the FOV.

In addition, in the above case, a stereoscopic image can be obtained by appropriately performing image processing on the image of the central area PAc, that is, the image including the image object OB1. On the other hand, since the images including the image objects OB2 and OB3 are viewed monocularly, it is possible to display only a flat image.

Further, in this embodiment, as described with reference to, for example, FIG. 6 and the like, in the first display device 100A and the second display device 100B, the display positions can be changed or selected by adjusting the degree of posture adjustment. In other words, the setting ranges of the respective display ranges (areas) can be adjusted for the overlapping areas Pa1 and Pb1 and the independent areas Pa2 and Pb2.

An example of adjusting the display range will be described below with reference to FIG. 9. Note that, here, as premise, it is assumed that an image with a lateral FOV of 50 degrees (total angle of view) is formed by the optical system of each of the display devices 100A and 100B, and it is assumed that in an example with reference to FIG. 6 and the like, when the optical systems of the display devices 100A and 100B are fixed to the holes HL1 as the first fixing holes, respectively, the range where the images are overlapped is a lateral FOV of 40 degrees (total angle of view). Further, it is assumed that when the optical systems of the display devices 100A and 100B are fixed to the holes HL2 as the second fixing holes, respectively, the range where the images are overlapped is a lateral FOV of 35 degrees (total angle of view). Note that, in any of the above aspects, a state in which the total angle of view of each of the overlapping areas Pa1 and Pb1 is 20 degrees or more (that is, the half angle of view is 10 degrees or more) is secured. In this case, a range in which good image formation is required is maintained in a state covered by the overlapping areas Pa1 and Pb1.

In an upper column δ1 of FIG. 9, a visual recognition state in the display devices 100A and 100B in the aspect using the holes HL1 is illustrated as a state Q1, and a visual recognition state in the aspect using the holes HL2 is illustrated as a state Q2. In addition, in a lower column 52, a state of the image area PA, which is the virtually entire image area in the aspect using the holes HL1 is illustrated as a state R1, and the state of the image area PA in the aspect using the holes HL2 is illustrated as a state R2.

In the above case, in the state Q1, a lateral width Wc in the overlapping areas Pa1 and Pb1 corresponds to the lateral FOV of 40 degrees, and lateral widths Wa and Wb in the independent areas Pa2 and Pb2 correspond to the lateral FOV of 10 (=50−40) degrees, respectively. Accordingly, in the image area PA illustrated in the state R1, an image of the combined lateral FOV of 60 (=40+10+10) degrees can be obtained as a whole.

Similarly, in the state Q2, by shifting the display range in the directions indicated by arrows AA1 and AA2 as compared with the state Q1, a lateral width WWc in the overlapping areas Pa1 and Pb1 corresponds to the lateral FOV of 35 degrees, and the lateral widths WWa and WWb in the independent areas Pa2 and Pb2 correspond to the lateral FOV of 15 (=50−35) degrees, respectively. Accordingly, in the image area PA illustrated in the state R2, an image of the combined lateral FOV of 65 (=35+15+15) degrees can be obtained as a whole. In other words, as is clear from comparison with the state R1 for the corresponding widths such as WWc, the overlapping areas Pa1 and Pb1 are narrowed, while the image area PA as a whole is widened. That is, in the above aspect, the angle of view in the lateral direction is changed (widened).

Note that the aspect of image display in the display element 80 may be variously changed in accordance with the changes described above.

In addition, in the case described above, the aspect ratio of the image area PA may also be set to various settings by appropriately adjusting the degree of overlapping and the aspect ratio of the display element 80. For example, it is conceivable that the aspect ratio is set to 9:16 in the state R1 while the aspect ratio is set to 1:2.35, which is a size of CinemaScope, in the state R2.

Further, in the adjustment described above, the adjustment margins DT illustrated in FIG. 7 extend in a direction in which the range of the overlapping area is adjusted in order to make fine adjustment as necessary so that the boundary positions between the overlapping area Pa1 and the independent area Pa2 and between the overlapping area Pb1 and the independent area Pb2, and the like match.

Here, in the case of the configuration described above, the state of the image is different between the overlapping areas Pa1 and Pb1, that is, areas closer to the center of the visual field of the human eye, and the independent areas Pa2 and Pb2, that is, the peripheral areas of the visual field of the human eyes. Regarding this, the characteristics relating to the human eyes will be described with reference to FIG. 10 and the like. FIG. 10 is a diagram for describing human visual characteristics. As illustrated in FIG. 10, of the human viewing angle (half-angle) in the right-left direction in which eyes are aligned, a range RA1 in which the retinal image is formed at the fovea centralis so that high-resolution central vision is achieved, is approximately 1 degree at the maximum, a range in which resolution to some extent or higher can be maintained even with an eyesight of approximately 1.0 is approximately 2 degrees at the maximum, and at a visual field angle of greater than or equal to 2 degrees, the resolution performance suddenly drops. Further, a range RA2 in which the numbers and the characters can be recognized is approximately 5 degrees at the maximum. Further, a range RA3 of color discrimination, in which changes in color and brightness are sensed, is approximately 20 degrees to 25 degrees at the maximum. That is, the human eyesight sharply drops as the visual field angle increases. In consideration of this, in this embodiment, by setting the angle of view of the entire area including the overlapping areas Pa1 and Pb1 and the independent areas Pa2 and Pb2 to be not less than 50 degrees, and the angles of view of the independent areas Pa2 and Pb2 on the peripheral sides of the overlapping areas Pa1 and Pb1 to 20 degrees to 25 degrees and −20 degrees to −25 degrees, respectively, the aspect such that a wide angle of view image is provided and the image quality is not deteriorated is achieved.

Figure 11:
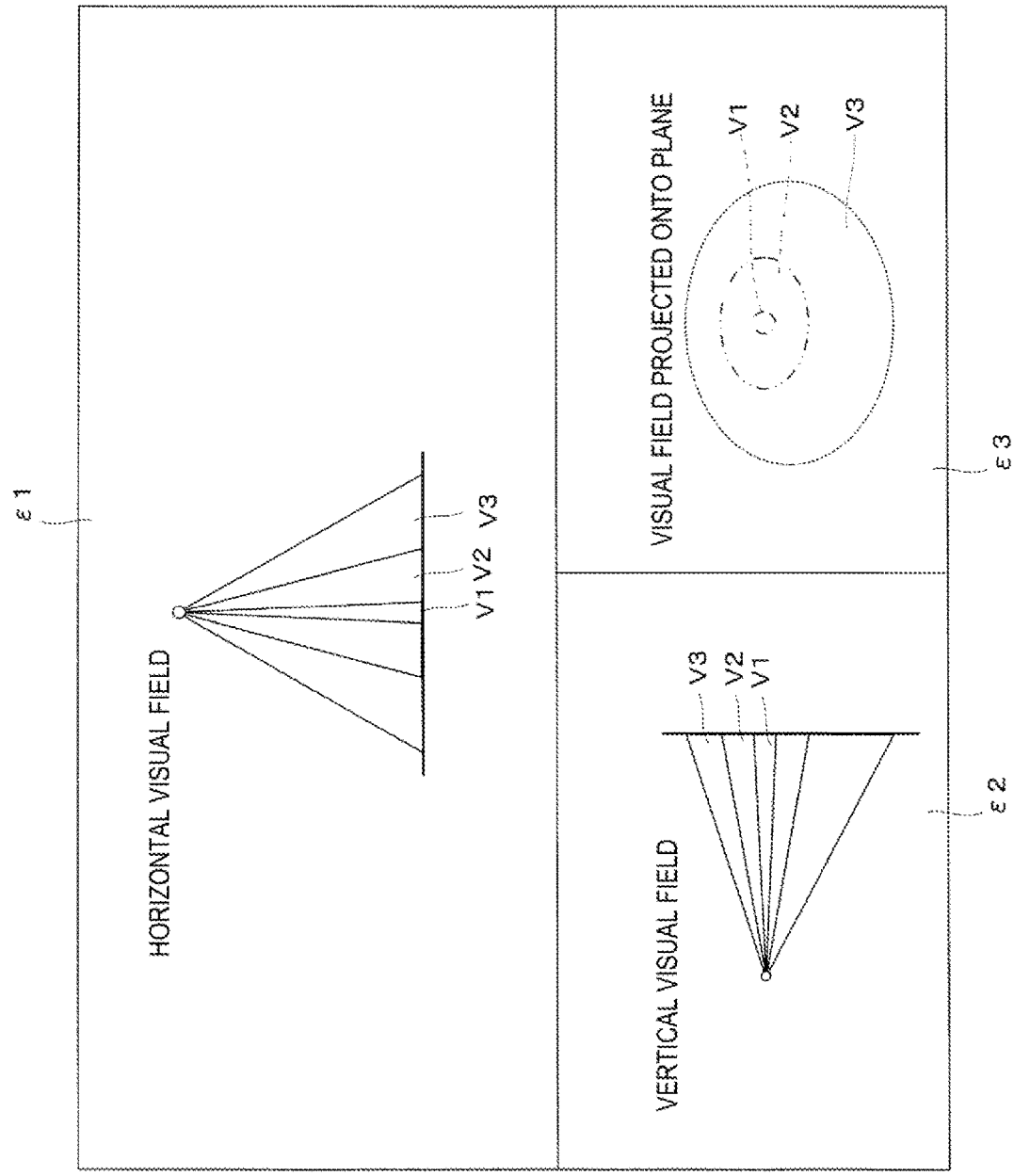
FIG. 11 is a conceptual diagram for describing a visual field of a wearer.

Further, with reference to FIG. 11, the matters described with reference to FIG. 10 will be described as the characteristics of the visual field range of the wearer US who wears the virtual image display apparatus 100. First, in FIG. 11, a first column ε1 to a third column ε3 are conceptual diagrams for describing the visual field of the wearer US. The first column ε1 illustrates a state of a horizontal visual field, the second column ε2 illustrates a state of a vertical (perpendicular) visual field, and the third column ε3 illustrates a state of a visual field projected on a plane (expansion of the visual field in the line-of-sight direction). Here, in each of the diagrams, a discriminative visual field V1 is a central area (angle of view within approximately 5 degrees) in which visual functions such as eyesight are excellent, an effective visual field V2 is a area in which information can be instantly received only by eye movements (horizontal visual field of approximately 30 degrees or less and perpendicular visual field of approximately 20 degrees or less), and a stable field of fixation V3 is a area in which gaze can be comfortably performed by eye/head movements and information can be effectively received (horizontal visual field of 60 degrees to 90 degrees and perpendicular visual field of 45 degrees to 70 degrees). From the discriminative visual field V1, for example, the line-of-sight direction of the wearer US watching the image is usually substantially the front direction. Accordingly, the central area PAc is provided in a range sufficiently wider than the discriminative visual field V1, from the center of the image, so that a range in which a stereoscopic image can be formed is set so as to include the range in which the visual function is excellent. As a result, even when the peripheral areas PAap and PAbp are planar images, it is possible to make it appear that a stereoscopic image is performed in the entire image of the display area. In other words, by making the central area PAc illustrated in FIG. 8 and the like include at least the range of the discriminative visual field V1 (angle of view of approximately 5 degrees) as a visual recognition range, and further, include a visual field VX (a range narrower than the effective visual field V2), which is a range of an angle of view of 10 degrees, which is considered to be a range in which characters can be identified, as the visual recognition range, the image display area can be expanded while ensuring the visual recognition of various images such as the recognition of stereoscopic images and the recognition of images with many characters.

In order to do so, in this embodiment, by setting the angles of view of the overlapping areas Pa1 and Pb1 to be not less than 10 degrees, respectively, it is ensured that a range that requires good visibility is included in the overlapping areas Pa1 and Pb1.

As described above, the virtual image display apparatus 100 according to this embodiment includes the first display device 100A configured to display the first image IMa for the right eye, the second display device 100B configured to display the second image IMb for the left eye, and the mounting members MP as the adjustment device AE configured to adjust the display position of the first image and the display position of the second image. The first display device 100A and the second display device 100B guide the imaging light ML in the second direction D2 intersecting the first direction D1 in which the first display device 100A and the second display device 100B are aligned, and display the first image IMa and the second image IMb, respectively. The adjustment device AE provides overlapping areas Pa1 and Pb1 that are visually recognized as overlapping and independent areas Pa2 and Pb2 that are visually recognized independently in the first image IMa and the second image IMb, respectively, by adjusting the display position of the first image and the display position of the second image.

In the virtual image display apparatus 100, the mounting members MP as the adjustment device AE configured to adjust the display position of the first image IMa and the display position of the second image IMb provide the overlapping areas Pa1 and Pb1 that are visually recognized as overlapping and the independent areas Pa2 and Pb2 that are visually recognized independently in the first image IMa and the second image IMb, respectively. Therefore, one large image in which the overlapping areas Pa1 and Pb1 and the independent areas Pa2 and Pb2 are combined can be visually recognized by binocular vision. In addition, when performing such adjustments, since the imaging light ML is guided in the second direction D2 intersecting the first direction D1 in which the first display device 100A and the second display device 100B are aligned, it is possible to avoid or suppress the increase in size of the apparatus due to the adjustments and the occurrence of design problems as a head-mounted type.

Second Exemplary Embodiment

Figure 12:
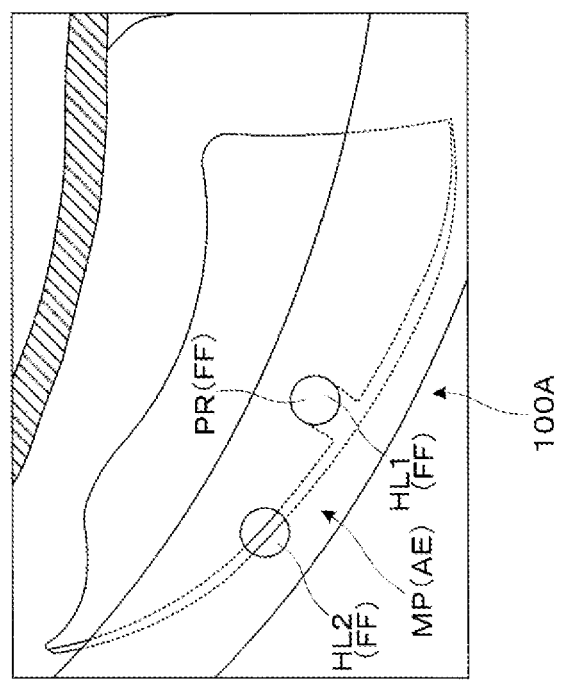
FIG. 12 is a conceptual diagram for describing a structure example of a mounting member for the posture adjustment of the virtual image display apparatus according to a second exemplary embodiment.

An example of a virtual image display apparatus according to a second exemplary embodiment will be described with reference to FIG. 12 and the like. FIG. 12 is a conceptual diagram for describing a structural example of a mounting member for posture adjustment in the virtual image display apparatus according to this embodiment, and is a diagram corresponding to FIG. 7.

The virtual image display apparatus according to this embodiment is a modification example of the virtual image display apparatus 100 exemplified in the first exemplary embodiment, and is similar to the virtual image display apparatus of the first exemplary embodiment except for the structure of the adjustment device AE. Thus, the description throughout the virtual image display apparatus will be omitted.

In FIG. 12, the mounting member MP of this embodiment as the adjustment device AE is similar to the one of the first exemplary embodiment in that the mounting member MP of this embodiment is constituted of the fitting members provided as the protrusion portion PR and the plurality of holes HL1 and HL2 that can be fitted to the protrusion portion PR. However, the mounting member MP of this embodiment is different in that the mounting member MP does not have a gap for fine adjustment because the mounting member MP restricts the rotation about the pupil and fixes the position, without play by a pin or the like. In this embodiment, fine adjustment is possible by adjusting the positions of the right and left pixels with a circuit. In other words, in this embodiment, the positional adjustments of the right and left pixels by the circuit and the mounting member MP cooperate to function as the adjustment device AE.

Ideally, it is desirable to display at an ideal position by fitting the protrusion portion PR into the hole HL1 or the hole HL2. However, there may by a slight position shift from the ideal position due to errors or the like in each component. In the first exemplary embodiment, as illustrated with reference to FIG. 7, adjustment margins (gaps) DT are provided in the holes HL1 and HL2 to enable fine adjustment. In contrast, in this embodiment, the fine adjustment is possible by processing by the circuit.

Hereinafter, an example of adjusting the positions of the right and left pixels by the circuit in the virtual image display apparatus according to the embodiment will be described with reference to FIGS. 13 and 14.

Figure 13:
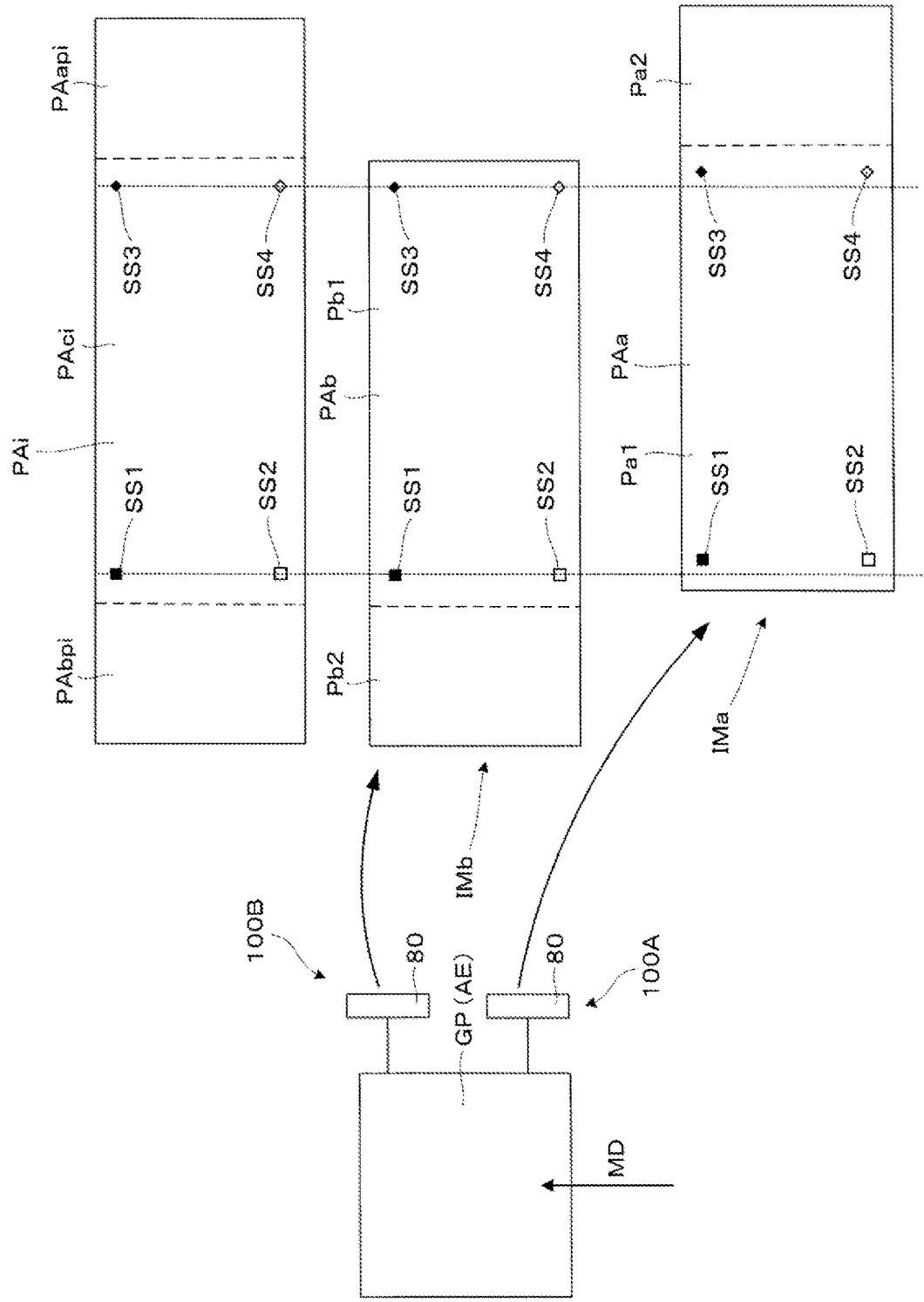
FIG. 13 is a conceptual diagram for describing adjustment of a display area by image processing in the virtual image display apparatus.
Figure 14:
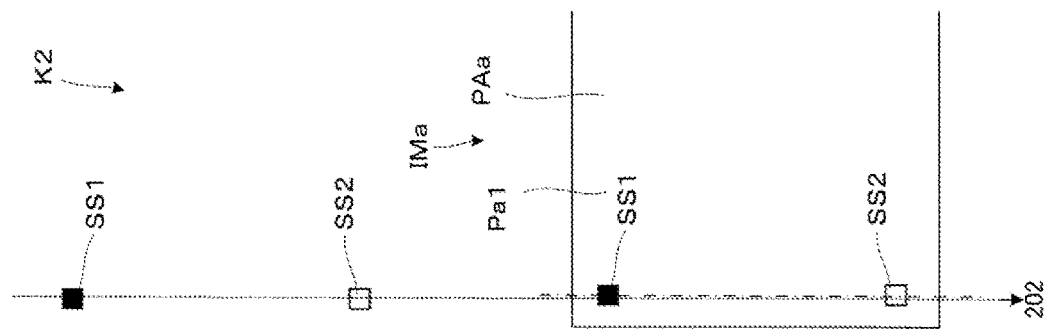
FIG. 14 is a partially enlarged conceptual diagram of FIG. 13 for describing the adjustment of the display area by image processing in the virtual image display apparatus.
Figure 14:
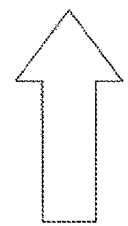
Figure 14:
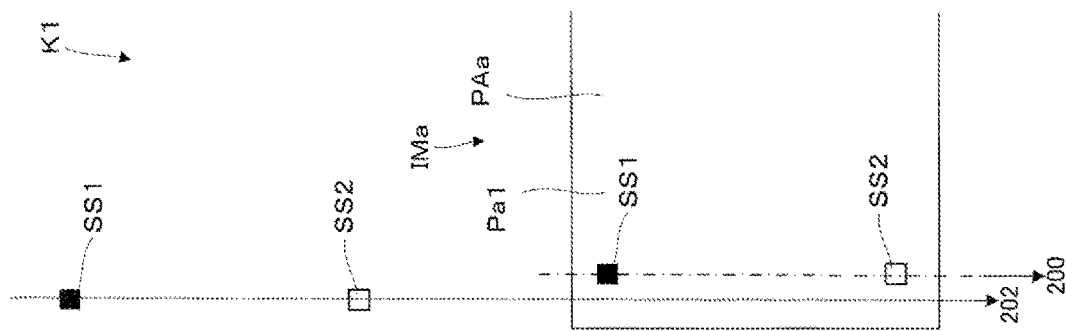

FIG. 13 is a conceptual diagram for describing the adjustment of the display area by image processing in the virtual image display apparatus. FIG. 14 is an enlarged conceptual diagram of a part extracting from FIG. 13 in order to explain the adjustment of the display area by image processing in the virtual image display apparatus.

As illustrated in FIG. 13, in this embodiment, in order to adjust the positions of the right and left pixels by the circuit, the virtual image display apparatus 100 includes an image processing unit GP that performs various image processing on the image data MD input as a display target. The image processing unit GP is coupled to the display elements 80 included in the first display device 100A and the second display device 100B, and outputs image data as the contents of the display operation in the display elements 80 as a result of the processing on the image data MD.

As one of various kinds of image processing, the image processing unit GP changes the display areas of the first display device 100A and the second display device 100B. In other words, the image processing unit GP adjusts the positions of the right and left pixels described above. Additionally, as a result, the image processing unit GP adjusts the boundary positions between the overlapping area Pa1 and the independent area Pa2 and the overlapping area Pb1 and the independent area Pb2.

Further, from the different point of view, the image processing unit GP is one constituent element of the adjustment device AE.

Further, in the example illustrated in FIG. 13, in addition to the above, an ideal state of an overall image area to be recognized is illustrated as an ideal image area PAi. A central area at this time is referred to as an ideal central area PAci, and peripheral areas are referred to as ideal peripheral areas PAapi and PAbpi. On this basis, reference points SS1 to SS4 are set at four corners on the ideal central area PAci as reference points for confirming whether the actual first image IMa and second image IMb match the ideal image area PAi. Specifically, the reference points SS1 to SS4 correspond to, for example, pixels provided in a matrix in the panel type display element 80.

In order to simplify the description, in the illustrated example, it is assumed that the display position of the second image IMb displayed by the second display device 100B matches the ideal image area PAi. On this basis, when the display position of the first image IMa displayed by the first display device 100A deviates from the ideal position (that is, when the first image IMa deviates from the second image IMb), the circuit makes the necessary fine adjustment to the first image IMa. Specifically, in the first image IMa in the case as illustrated in FIG. 14, it is assumed that the reference points SS1 and SS2 slightly deviate in the display element 80 of the first display device 100A as illustrated in a state κ1. Here, it is assumed that the reference points SS1 and SS2 are to be displayed in the 200th row of the pixel rows constituting the display element 80 when the assembly is ideal (assembly without deviation), but in reality, the reference points SS1 and SS2 deviate by two pixels from the ideal state (state without deviation). In this case, as illustrated in a state κ2, by shifting the entire display area of the first image IMa by the image processing unit GP as the adjustment device AE so that the reference points SS1 and SS2 are displayed in the 202nd row in consideration of the deviation of two pixels, the first image area PAa can be brought into a state that matches the ideal image area PAi.

Note that the above is an example, and various aspects can be considered as long as the deviation between right and left can be adjusted, not limited to the case in which the second image IMb is used as the reference.

As described above, also in this embodiment, one large image in which the overlapping areas Pa1 and Pb1 and the independent areas Pa2 and Pb2 are combined can be visually recognized by binocular vision. In addition, when performing such adjustments, since the imaging light ML is guided in the second direction D2 intersecting the first direction D1 in which the first display device 100A and the second display device 100B are aligned, it is possible to avoid or suppress the increase in size of the apparatus due to the adjustments and the occurrence of design problems as a head-mounted type. In particular, in this embodiment, the display area can be set to an appropriate state by processing by a circuit.

Third Exemplary Embodiment

Figure 15:
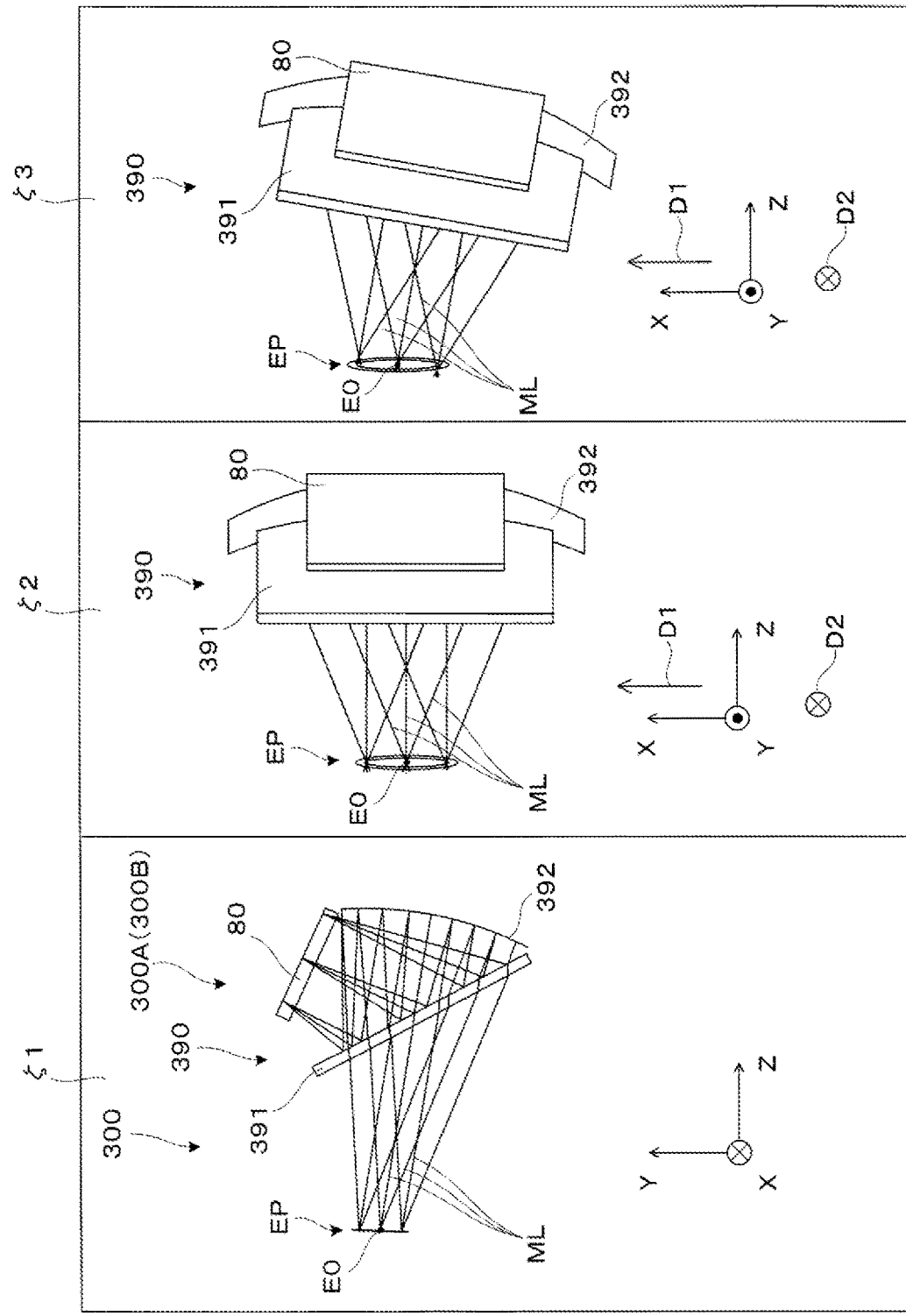
FIG. 15 is a conceptual diagram illustrating an example of a virtual image display apparatus according to a third exemplary embodiment.

Hereinafter, an example of a virtual image display apparatus according to a third exemplary embodiment will be described with reference to FIG. 15. FIG. 15 is a conceptual diagram illustrating an example of a virtual image display apparatus according to this embodiment, and is a diagram corresponding to FIGS. 2 and 3.

The virtual image display apparatus according to this embodiment illustrates an example in which a configuration of an optical system differs, and the method of adjusting the posture of each of the display devices and the like are similar to those of the first exemplary embodiment and the like, so that the details thereof will be omitted.

A virtual image display apparatus 300 (first display device 300A) according to this embodiment includes the display element 80 and a light guide system 390 as illustrated in a first column ζ1. Of these, the light guide system 390 includes a plate-shaped see-through mirror 391 and a concave mirror 392, and is a so-called bird bath-shaped optical system. Hereinafter, the description is given along an optical path of the imaging light ML. First, the imaging light ML emitted from the display element 80 is partially reflected by the see-through mirror 391 and directed toward the concave mirror 392, reflected by the concave mirror 392, and some of the components of the imaging light ML again heading for the see-through mirror 391 pass through the see-through mirror 391, and reach the exit pupil EP. Note that, the concave mirror 392 may also be a see-through mirror so that the external light can be visually recognized in an overlapping state.

Also in this embodiment, as illustrated in a second column ζ1 and a third column ζ3, the entire first display device 300A and an entire second display device 300B can rotate about the axis passing through the center position EO of the exit pupil EP in the perpendicular axis direction, that is, in the ±Y direction, which is the second direction D2. Thereby, also in this embodiment, one large image in which the overlapping areas Pa1 and Pb1 and the independent areas Pa2 and Pb2 are combined can be visually recognized by binocular vision. In addition, when performing such adjustments, since the imaging light ML is guided in the second direction D2 intersecting the first direction D1 in which the first display device 300A and the second display device 300B are aligned, it is possible to avoid or suppress the increase in size of the apparatus due to the adjustments and the occurrence of design problems as a head-mounted type.

Fourth Exemplary Embodiment

Figure 16:
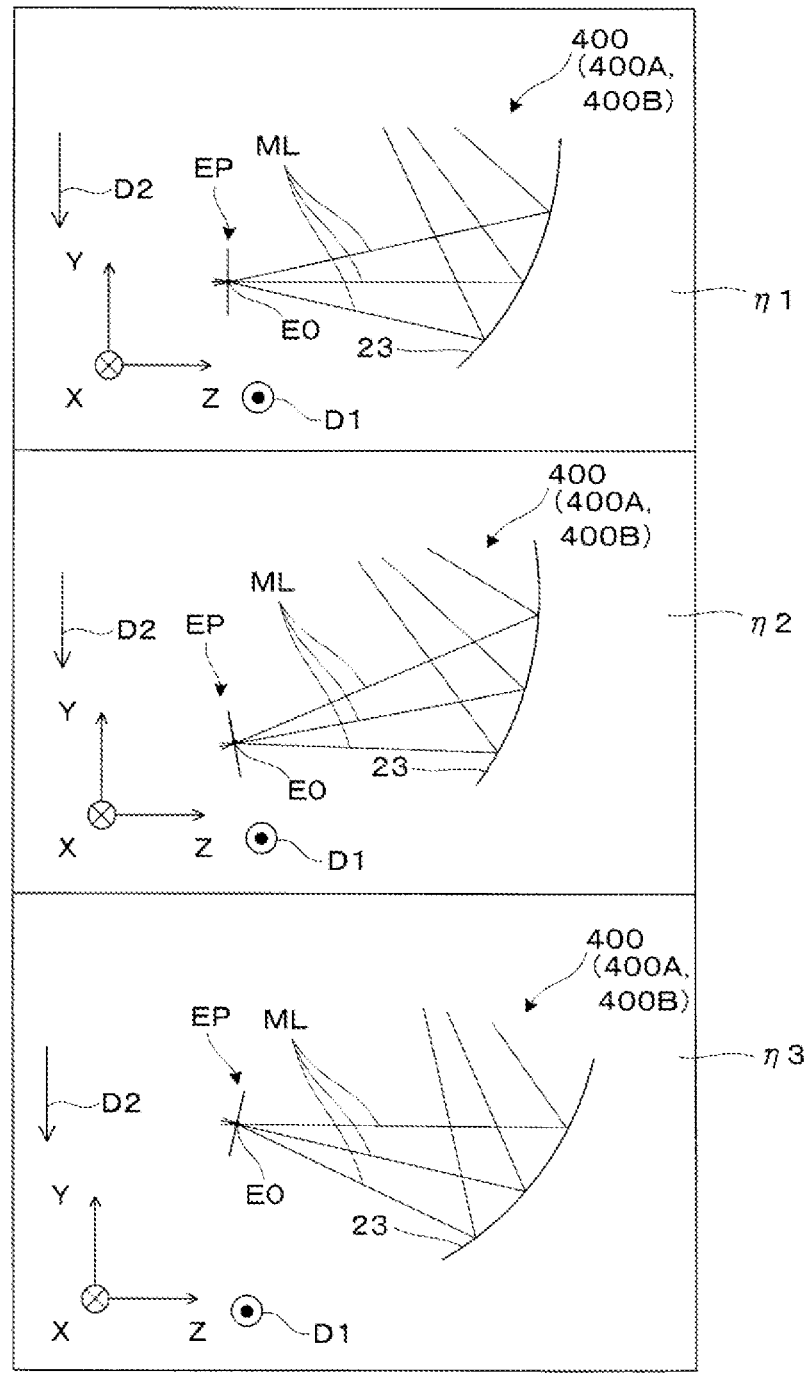
FIG. 16 is an optical path diagram describing an example of a virtual image display apparatus according to a fourth exemplary embodiment.
Figure 17:
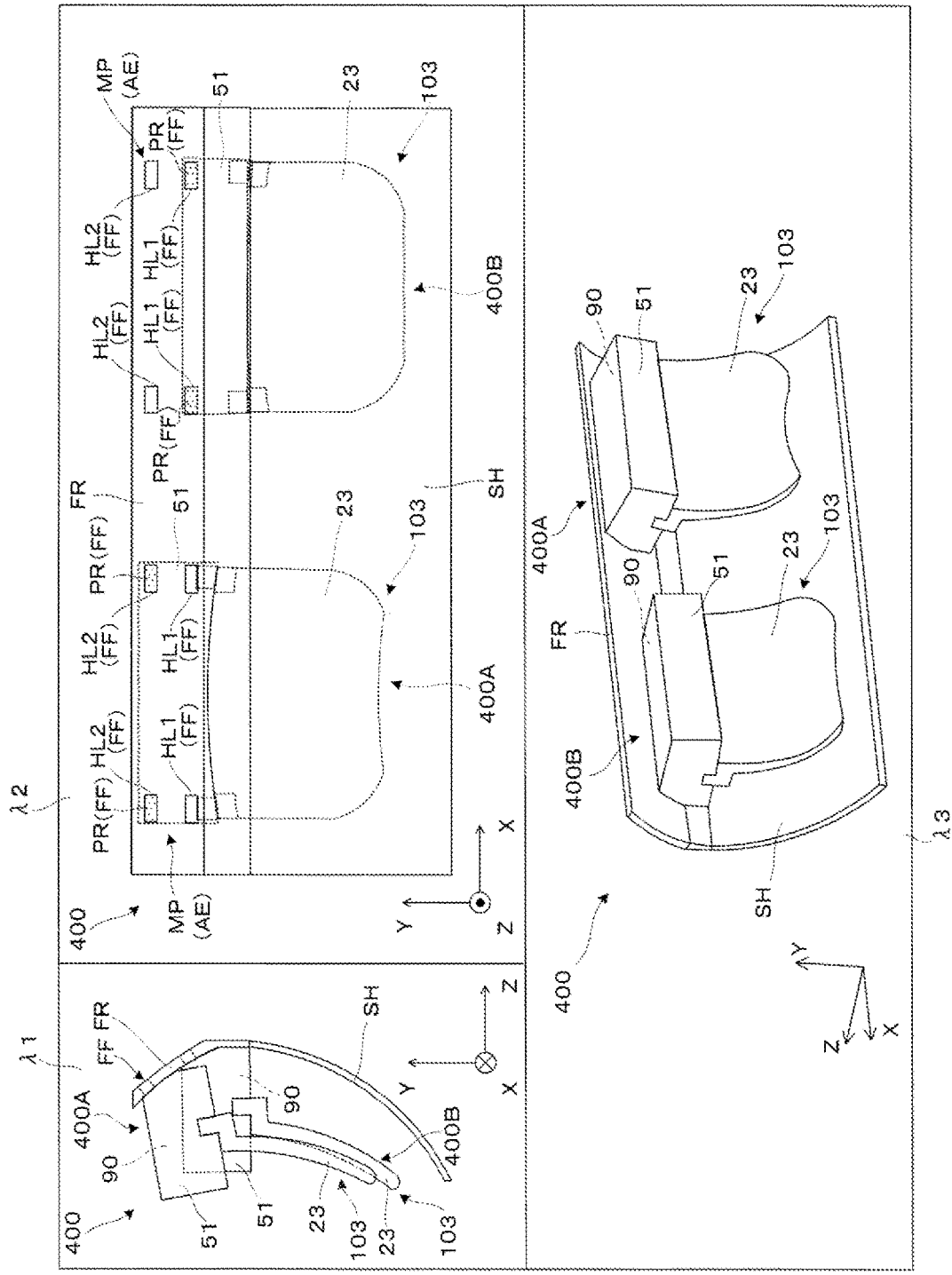
FIG. 17 is a conceptual diagram for describing an example of a structure of the virtual image display apparatus.
Figure 18:
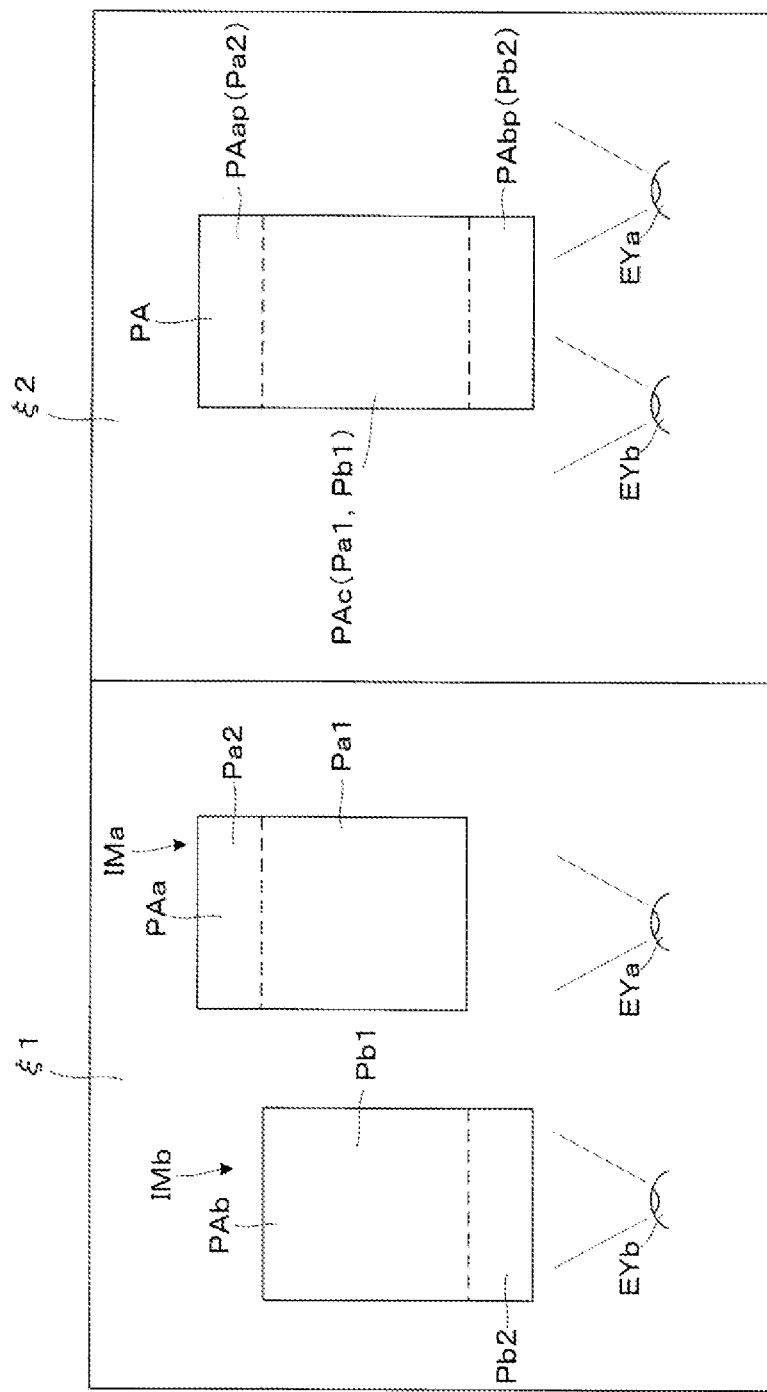
FIG. 18 is a conceptual diagram of an entire image area recognized by binocular vision.

Hereinafter, an example of a virtual image display apparatus according to a fourth exemplary embodiment will be described with reference to FIG. 16 and the like. FIG. 16 is an optical path diagram for describing an example of a virtual image display apparatus 400 according to this embodiment. FIG. 17 is a conceptual diagram for describing an example of a structure of the virtual image display apparatus 400. Further, FIG. 18 is a conceptual diagram of the entire image area PA recognized by binocular vision, and is a diagram corresponding to FIG. 8.

In the embodiments described above, the display positions of the first and second images IMa and IMb are changed in the right-left direction (horizontal direction, or lateral direction) in which the eyes are aligned. That is, the angle of view in the lateral direction is changed. In contrast, this embodiment differs from the other embodiments in that the display position is changed in the direction intersecting the right-left direction (horizontal direction, or lateral direction) in which the eyes are aligned. Note that, in this embodiment, as an example, a case of changing the display position in the up-down direction (perpendicular direction, or longitudinal direction) perpendicular to the right-left direction (horizontal direction, or lateral direction) in which the eyes are aligned will be described. In other words, the angle of view in the longitudinal direction is changed.

First, in the case of this embodiment, as illustrated in a first column η1 to a third column η3 of FIG. 16, in the virtual image display apparatus 400, for the imaging light ML, an entire first display device 400A and an entire second display device 400B can rotate about the axis passing through the center position EO of the exit pupil EP in the horizontal axis direction, that is, in the ±X direction, which is the first direction D1. Note that the first column η1 illustrates a state prior to rotation (a state with a tilt is 0 degrees), the second column 112 illustrates a state tilted in the upward direction (+Y direction), and the third column η3 illustrates a state tilted in the downward direction (−Y direction) (for example, a state of being tilted by 10 degrees).

Hereinafter, with reference to FIG. 17, an example of the structure of the virtual image display apparatus 400 that enables posture adjustment as described above will be described. Of FIG. 17, a first column λ1 is a conceptual side view of the virtual image display apparatus 400, a second column λ2 is a conceptual front view of the virtual image display apparatus 400, and a third column λ3 is a conceptual perspective view of the virtual image display apparatus 400.

In the virtual image display apparatus 400 of the example illustrated in FIG. 17, the holes HL1 and HL2 are arranged so as to enable the posture change of the virtual image display apparatus 400 for changing the optical path described with reference to FIG. 16. Specifically, in the illustrated example, the frame FR has a curved surface that forms an arc in the +Y direction, and the holes HL1 and HL2 are arranged in the +Y direction. Note that the holes HL1 and the holes HL2 are each provided as a pair of holes arranged in the +X direction. In addition, the protrusion portions PR are configured as a pair arranged in the +X direction in order to function as the fitting members FF in correspondence with the holes HL1 and the like, and are provided at both ends at an upper end of the case 51 that houses the light guide system 90 of each of the display devices 400A and 400B. With the configuration described above, the display position can be changed in the up-down direction (perpendicular direction, or longitudinal direction). In the illustrated example, the position of the first display 400A for the right eye is changed to be relatively higher than the position of the second display device 400B for the left eye. Thus, regarding the display position in this case, as illustrated in a first column ξ1 of FIG. 18, the first image area PAa is divided into the overlapping area Pa1 on the lower side and the independent area Pa2 on the upper side in the up-down direction. Similarly, the second image area PAb is divided into the overlapping area Pb1 on the upper side and the independent area Pb2 on the lower side in the up-down direction. Further, as illustrated in a second column ξ2, the image area PA as a recognized virtual entire image area is a single image that continues in the longitudinal direction.

Note that the method of making the difference in the up-down direction is not limited to the above-described example, and various aspects are possible. For example, one of the right and left sides is set so that the center of the image is above the horizontal as illustrated in the second column η2, and the other is set so that the center of the image is below the horizontal as illustrated in the third column η3. Alternatively, either may be horizontal and the other may be below or above the horizontal.

Also in this embodiment, the entire first display device 400A and the entire second display device 400B are rotatable about the axis passing through the center position EO of the exit pupil EP. Thereby, also in this embodiment, one large image in which the overlapping areas Pa1 and Pb1 and the independent areas Pa2 and Pb2 are combined can be visually recognized by binocular vision. In particular, in this embodiment, the first display device 400A and the second display device 400B are rotatable about the horizontal axis direction, that is, in the ±X direction which is the first direction D1. Therefore, it is possible to visually recognize a large image that is combined in the longitudinal direction (up-down direction). In addition, when performing such adjustments, since the imaging light ML is guided in the second direction D2 intersecting the first direction D1 in which the first display device 400A and the second display device 400B are aligned, it is possible to avoid or suppress the increase in size of the apparatus due to the adjustments and the occurrence of design problems as a head-mounted type.

Modification Examples and Others

The present disclosure is described according to the above-mentioned exemplary embodiments, but the present disclosure is not limited to the above-mentioned exemplary embodiments. The present disclosure may be carried out in various aspects without departing from the gist of the present disclosure, and, for example, the following modifications may be carried out.

It is also conceivable to appropriately combine the embodiments described above, and for example, an aspect may be adopted in which the posture is adjusted for both the right-left direction and the up-down direction.

In the embodiments described above, the first image IMa for the right and the second image IMb for the left at the display positions are provided with both the overlapping area and the independent area. However, it is also conceivable that only one of the right and left images has both areas. Further, in the embodiments described above, both images are provided with the overlapping area and the independent area, and the ratio of these areas can be changed by adjusting the posture. However, it is also possible to include an aspect that only overlapping areas exist and no independent areas exist by adjusting the posture.

As the shade SH, any of various dimming devices that perform dimming by limiting light to be transmitted (external light) can be adopted. For example, the shade SH may be one that electrically adjusts the transmittance. Further, as the shade SH, a mirror liquid crystal, an electronic shade, or the like can be used. Alternatively, the shade SH may adjust the transmittance according to the external light brightness. When the external light is blocked by the shade SH, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called video see-through product constituted of a virtual image display apparatus and an imaging device.

In the description above, the virtual image display apparatus 100 and the like are assumed to be used in a state being mounted on a head, but the virtual image display devices 100 and 300 may also be used as a hand-held display that is used by looking into like using binoculars without mounting on the head. In other words, the head-mounted display also includes a hand-held display according to an aspect of the present disclosure.

In addition, for example, it is also conceivable to change the embodiments described above to an aspect in which a reference configuration is such that the optical axis (emission optical axis) AX extends downward by approximately 10 degrees with respect to the +Z (forward) direction, and the display position is changed in the right-left direction or the up-down direction with respect to this reference configuration. By setting the optical axis AX downward by approximately 10 degrees on the front side with respect to the Z-axis, which is the horizontal axis, the fatigue of the eyes EY of the wearer US observing the virtual image can be reduced. In this case, the shape of the display element 80 can be appropriately changed as necessary by correction on the panel side.

A virtual image display apparatus according to a specific aspect includes a first display device configured to display a first image for a right eye, a second display device configured to display a second image for a left eye, and an adjustment device configured to adjust a display position of the first image and a display position of the second image, and the first display device and the second display device guide imaging light in a second direction intersecting a first direction in which the first display device and the second display device are aligned, and display the first image and the second image and the adjustment device provides makes an adjustment to provide an overlapping area in which the first image and the second image are visually recognized in an overlapping area and an independent area in which the first image and the second image are visually recognized independently.

In the virtual image display apparatus, the adjustment device configured to adjust the display position of the first image and the display position of the second image makes an adjustment to provide an overlapping area in which the first image and the second image are visually recognized in an overlapping area and an independent area in which the first image and the second image are visually recognized independently. Therefore, one large image in which the overlapping areas and the independent areas are combined can be visually recognized by binocular vision. In addition, when performing such adjustments, since the imaging light is guided in the second direction intersecting the first direction in which the first display device and the second display device are aligned, it is possible to avoid or suppress the increase in size of the apparatus due to the adjustments and the occurrence of design problems as the head-mounted type.

In a specific aspect of the present disclosure, the adjustment device adjusts postures of the first display device and the second display device by axial rotation thereof. In this case, an accurate display position adjustment is possible.

In another aspect of the present disclosure, the virtual image display apparatus includes a support member configured to support the first display device and the second display device, and the adjustment device includes mounting members configured to change support positions where the first display device and the second display device are supported by the support member. In this case, the display position can be adjusted by changing the support position with each of the mounting members.

In still another aspect of the present disclosure, each of the mounting members includes fitting members that are provided at a plurality of positions of the support member, respectively, and are configured to be fitted. In this case, the display position can be adjusted by changing the fitting position.

In yet another aspect of the present disclosure, each of the fitting members has an adjustment margin extending in a direction in which a range of the overlapping area is adjusted. In this case, the display position can be finely adjusted by using the adjustment margin.

In a further aspect of the present disclosure, the adjustment device includes an image processing unit configured to change display areas of the first display device and the second display device, and the image processing unit adjusts a boundary position between the overlapping area and the independent area for each of the display areas. In this case, the display position can be adjusted by the image processing unit included in the adjustment device.

In a still further aspect of the present disclosure, the adjustment device sets an angle of view of the overlapping area in both the first image and the second image to ±10 degrees or greater. In this case, a range requiring high visibility can be included in the overlapping area.

In yet further aspect of the present disclosure, the adjustment device sets an angle of view of an entire area including the overlapping area and the independent area in both the first image and the second image to 50 degrees or more, and sets an angle of view of the independent area on a peripheral side of the overlapping area in both the first image and the second image is to 20 degrees to 25 degrees and −20 degrees to −25 degrees, respectively. In this case, image recognition with a sufficiently wide angle of view can be made as a whole while ensuring a range requiring high visibility in the overlapping area.

In yet another aspect of the present disclosure, the adjustment device adjusts and changes lateral angles of view of the display areas of the first display device and the second display device. In this case, a wide image can be formed in the lateral direction.

In yet another aspect of the present disclosure, the adjustment device adjusts and changes longitudinal angles of view of the display areas of the first display device and the second display device. In this case, a wide image can be formed in the longitudinal direction.

In yet another aspect of the present disclosure, the virtual image display apparatus includes a dimming member configured to cover the first display device and the second display device that are configured to be moved by the adjustment device. In this case, the amount of external light to be transmitted can be adjusted.

In yet another aspect of the present disclosure, each of the first display device and the second display device includes a display element, a projection optical system configured to converge the imaging light emitted from the display element, a prism in which the imaging light emitted from the projection optical system is incident on an incident surface while being refracted, is totally reflected by an internal reflecting surface, and is emitted from an emission surface while being refracted, and a see-through mirror configured to reflect the imaging light emitted from the prism toward a pupil position and transmit external light. In this case, the see-through mirror, the projection optical system, and the prism can improve the optical performance and reduce the size of the apparatus.

In yet another aspect of the present disclosure, a Z-shaped optical path is formed by two bends, a bend at the internal reflecting surface of the prism and a bend at the see-through mirror. In this case, the apparatus can be made smaller by bending the optical path in a Z shape.

In yet another aspect of the present disclosure, the light guide system forms an off-axis optical system. In this case, miniaturization of the optical system and consequently miniaturization of the entire apparatus can be achieved while maintaining the resolution.

What is claimed is:
1. A virtual image display apparatus comprising:
a first display device configured to display a first image for a right eye;
a second display device configured to display a second image for a left eye;
an adjustment device configured to adjust a display position of the first image and a display position of the second image, wherein
the first display device and the second display device guide imaging light in a second direction intersecting a first direction in which the first display device and the second display device are aligned, and display the first image and the second image, the adjustment device makes an adjustment to provide an overlapping area in which the first image and the second image are visually recognized in the overlapping area and an independent area in which the first image and the second image are visually recognized independently, the adjustment device adjusts the overlapping area by shifting at least one of the display position of the first image and the display position of the second image, and the first display device and the second display device include a display element, a projection optical system configured to converge the imaging light emitted from the display element, a prism in which the imaging light emitted from the projection optical system is incident on an incident surface while being refracted, is totally reflected by an internal reflecting surface, and is emitted from an emission surface while being refracted, and a see-through mirror configured to reflect the imaging light emitted from the prism toward a pupil position and transmit external light.

2. The virtual image display apparatus according to claim 1, wherein the adjustment device adjusts postures of the first display device and the second display device by axial rotation thereof.

3. The virtual image display apparatus according to claim 1 comprising a support member configured to support the first display device and the second display device, wherein the adjustment device includes a mounting member configured to change support positions where the first display device and the second display device are supported by the support member.

4. The virtual image display apparatus according to claim 3, wherein the mounting member includes fitting members that are provided at a plurality of positions of the support member and are configured for fitting.

5. The virtual image display apparatus according to claim 4, wherein the fitting members have an adjustment margin extending in a direction in which a range of the overlapping area is adjusted.

6. The virtual image display apparatus according to claim 1, wherein the adjustment device includes an image processing unit configured to change display areas of the first display device and the second display device, and the image processing unit adjusts a boundary position between the overlapping area and the independent area.

7. The virtual image display apparatus according to claim 1, wherein the adjustment device sets an angle of view of the overlapping area to ±10 degrees or greater.

8. The virtual image display apparatus according to claim 1, wherein the adjustment device sets an angle of view of an entire area including the overlapping area and the independent area to 50 degrees or greater, and sets an angle of view of the independent area on a peripheral side of the overlapping area to 20 degrees to 25 degrees or −20 degrees to −25 degrees.

9. The virtual image display apparatus according to claim 1, wherein the adjustment device adjusts and changes lateral angles of view of the display areas of the first display device and the second display device.

10. The virtual image display apparatus according to claim 1, wherein the adjustment device adjusts and changes longitudinal angles of view of the display areas of the first display device and the second display device.

11. The virtual image display apparatus according to claim 1, comprising a dimming member configured to cover the first display device and the second display device that are configured to be moved by the adjustment device.

12. The virtual image display apparatus according to claim 1, wherein a Z-shaped optical path is formed by two-stage folding achieved by folding the optical path at the internal reflecting surface of the prism and at the see-through mirror.

13. The virtual image display apparatus according to claim 1, wherein the light guide system forms an off-axis optical system.

14. A virtual image display apparatus comprising: a first display device configured to display a first image for a right eye;

a second display device configured to display a second image for a left eye;

an adjustment device configured to adjust a display position of the first image and a display position of the second image;

a dimming member configured to cover the first display device and the second display device that are configured to be moved by the adjustment device, wherein the first display device and the second display device guide imaging light in a second direction intersecting a first direction in which the first display device and the second display device are aligned, and display the first image and the second image, the adjustment device makes an adjustment to provide an overlapping area in which the first image and the second image are visually recognized in the overlapping area and an independent area in which the first image and the second image are visually recognized independently, and the adjustment device adjusts the overlapping area by shifting at least one of the display position of the first image and the display position of the second image.

* * * * *